(12) United States Patent
Chien et al.

(10) Patent No.: US 11,558,889 B2
(45) Date of Patent: *Jan. 17, 2023

(54) USER EQUIPMENT AND BASE STATION FOR MOBILE COMMUNICATION SYSTEM

(71) Applicant: Institute For Information Industry, Taipei (TW)

(72) Inventors: Chun-Che Chien, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 580 days.

This patent is subject to a terminal disclaimer.

(21) Appl. No.: 16/533,758

(22) Filed: Aug. 6, 2019

(65) Prior Publication Data

US 2020/0053765 A1 Feb. 13, 2020

Related U.S. Application Data

(60) Provisional application No. 62/715,297, filed on Aug. 7, 2018.

(51) Int. Cl.
*H04W 72/04* (2009.01)
*H04W 72/12* (2009.01)
*H04L 1/18* (2006.01)
*H04L 5/00* (2006.01)

(52) U.S. Cl.
CPC ....... *H04W 72/1289* (2013.01); *H04L 1/1812* (2013.01); *H04L 1/1854* (2013.01); *H04L 1/1861* (2013.01); *H04L 5/0053* (2013.01); *H04L 5/0055* (2013.01); *H04W 72/042* (2013.01); *H04W 72/0446* (2013.01); *H04W 72/1242* (2013.01); *H04L 5/001* (2013.01)

(58) Field of Classification Search
None
See application file for complete search history.

(56) References Cited

U.S. PATENT DOCUMENTS

| 11,044,746 | B2* | 6/2021 | Chien | H04W 72/1289 |
| 2019/0052375 | A1* | 2/2019 | Kalhan | H04B 17/24 |
| 2021/0184804 | A1* | 6/2021 | Park | H04L 1/1822 |

* cited by examiner

*Primary Examiner* — Willie J Daniel, Jr.
(74) *Attorney, Agent, or Firm* — Skaar Ulbrich Macari, P.A.

(57) ABSTRACT

A user equipment (UE) and a base station (BS) for a mobile communication system are provided. The UE receives, from the BS, a first downlink control information (DCI) indicating a first uplink resource for transmitting a first uplink signal, and then receives, from the BS, a second DCI indicating a second uplink resource for transmitting a second uplink signal. The BS configures the second uplink resource to be advanced to the first uplink resource in the time domain based on the uplink out-of-order configuration. The UE decides the transmission of the first uplink signal according to the condition of resource configuration.

13 Claims, 18 Drawing Sheets

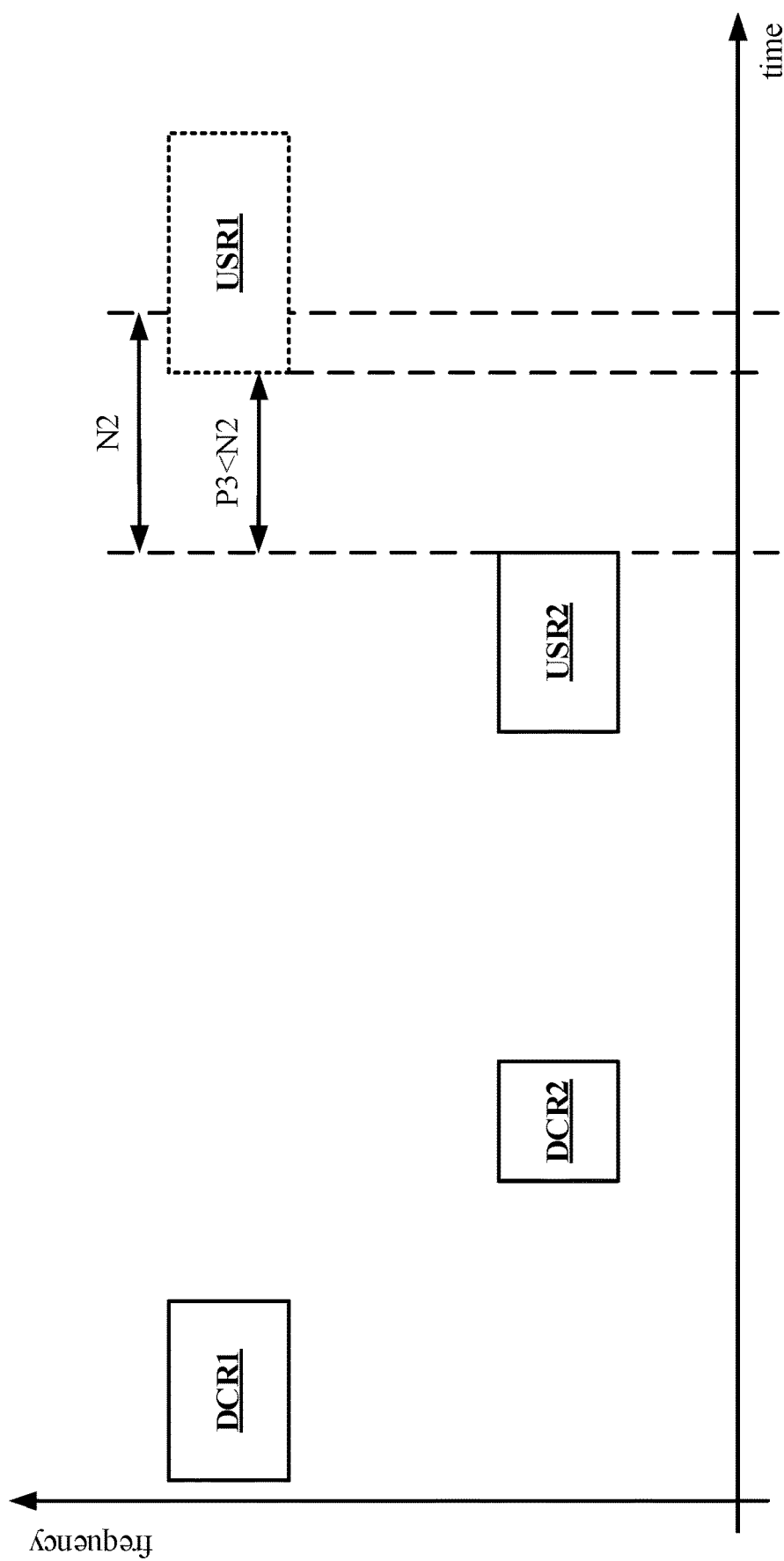

USER EQUIPMENT AND BASE STATION FOR MOBILE COMMUNICATION SYSTEM

PRIORITY

This application claims priority to U.S. Provisional Patent Application No. 62/715,297 filed on Aug. 7, 2018, which is hereby incorporated by reference in its entirety.

FIELD

The present invention relates to a user equipment (UE) and a base station (BS) for a mobile communication system. More particularly, when the BS configures the uplink resource under an uplink out-of-order configuration, the UE decides the uplink signal transmission according to the condition of the resource configuration.

BACKGROUND

With the rapid development of wireless communication technologies, wireless communication has found wide application in people's life, and people's demand for wireless communication is increasing. The next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC).

The current planning of the 5G mobile communication system allows the base station (BS) to configure different uplink radio resources for a UE to perform the uplink transmission in response to the requirements of the different service types, but regardless what the service type each of the uplink radio resources corresponds to. Thus, the BS always configures the uplink radio resources in order and transmits the DCIs to indicate the uplink radio resources for the UE to transmit the uplink signals. However, since the URLLC service is mainly designed for the vehicle communication, the industrial control and any applications having high reliable and low latency transmission requirement, the UE may have the need of instantaneous transmission due to some urgent conditions. Under such circumstances, the BS in the prior art inevitably could not meet the high reliable and low latency transmission requirement of the URLLC service since the uplink radio resources can only be configured in order. Moreover, even the BS would like to break the in-order configuration restriction to satisfy the need of instantaneous transmission for urgency, there is no relevant solution for such transmission between the BS and the UE in the prior art so as to have difficulty in the implementation.

Accordingly, an urgent need exists in the art to provide an uplink transmission mechanism to schedule the uplink radio resources in response to the need of instantaneous transmission for urgency and make the BS and the UE able to deal with such instantaneous transmission for urgency.

SUMMARY

An objective of the present invention is to provide an uplink transmission mechanism, which enables a base station (BS) to configure the uplink resource under an uplink out-of-order configuration, and enables a user equipment (UE) to decide the uplink signal transmission under the uplink out-of-order configuration according to a relative position relationship among the radio resources in the time domain. Accordingly, the uplink transmission mechanism of the present invention can schedule the uplink radio resources in response to the need of instantaneous transmission for urgency and make the BS and the UE able to deal with such instantaneous transmission for urgency.

The disclosure includes a user equipment (UE) for a mobile communication system. The UE comprises a transceiver and a processor. The processor is electrically connected to the transceiver, and configured to execute the following operations: receiving first downlink control information (DCI) on a first physical downlink control channel (PDCCH) resource from a base station (BS) via the transceiver, the first DCI indicating a first physical downlink shared channel (PDSCH) resource and a first physical uplink control channel (PUCCH) resource; receiving second DCI on a second PDCCH resource from the BS via the transceiver after receiving the first DCI, the second DCI indicating a second PDSCH resource and a second PUCCH resource, the second PUCCH resource being configured to be advanced to the first PUCCH resource in a time domain based on an uplink out-of-order configuration; determining whether to continue processing a first downlink data signal on the first PDSCH resource according to whether a relative position relationship among at least two of the first PDSCH resource, the second PDSCH resource, the first PUCCH resource and the second PUCCH resource in the time domain meets a processing criterion; generating a first HARQ-ACK message according to a whole processing result of the first downlink data signal when determining to continue processing the first downlink data signal; generating the first HARQ-ACK message according to a current processing result of the first downlink data signal when determining not to continue processing the first downlink data signal; processing a second downlink data signal on the second PDSCH resource; generating a second HARQ-ACK message according to a processing result of the second downlink data signal; transmitting the second HARQ-ACK message on the second PUCCH resource to the BS via the transceiver; and transmitting the first HARQ-ACK message on the first PUCCH resource to the BS via the transceiver.

Further provided is a user equipment (UE) for a mobile communication system. The UE comprises a transceiver and a processor. The processor is electrically connected to the transceiver and configured to execute the following operations: receiving first downlink control information (DCI) on a first physical downlink control channel (PDCCH) resource from a base station (BS) via the transceiver, the first DCI indicating a first physical uplink shared channel (PUSCH) resource; receiving second DCI on a second PDCCH resource from the BS via the transceiver after receiving the first DCI, the second DCI indicating a second PUSCH resource, the second PUSCH resource being configured to be advanced to the first PUSCH resource in a time domain based on an uplink out-of-order configuration; determining whether to continue generating a first uplink data signal, which is about to be transmitted on the first PUSCH resource, according to whether a relative position relationship among at least two of the first PDCCH resource, the second PDCCH resource, the first PUSCH resource and the second PUSCH resource in the time domain meets a processing criterion; generating a second uplink data signal which is about to be transmitted on the second PUSCH resource; transmitting the second uplink data signal on the second PUSCH resource via the transceiver; and transmitting at least part of the first uplink data signal on the first PUSCH resource via the transceiver when determining to continue generating the first uplink data signal.

Also provided is a base station (BS) for a mobile communication system. The BS comprises a transceiver and a processor. The processor is electrically connected to the transceiver, and configured to execute the following operations: transmitting first downlink control information (DCI) on a first physical downlink control channel (PDCCH) resource to a user equipment (UE) via the transceiver, the first DCI indicating a first physical downlink shared channel (PDSCH) resource and a first physical uplink control channel (PUCCH) resource; transmitting second DCI on a second PDCCH resource to the UE via the transceiver after transmitting the first DCI, the second DCI indicating a second PDSCH resource and a second PUCCH resource, the second PUCCH resource being configured to be advanced to the first PUCCH resource in a time domain based on an uplink out-of-order configuration; determining whether the UE continues processing a first downlink data signal on the first PDSCH resource according to whether a relative position relationship among at least two of the first PDSCH resource, the second PDSCH resource, the first PUCCH resource and the second PUCCH resource in a time domain meets a processing criterion; receiving a second HARQ-ACK message on the second PUCCH resource; and receiving a first HARQ-ACK message on the first PUCCH resource. The first HARQ-ACK message indicates a whole processing result of the first downlink data signal when the BS determines the UE continues processing the first downlink data signal, and the first HARQ-ACK message indicates a current processing result of the first downlink data signal when the BS determines the UE does not continue processing the first downlink data signal.

The detailed technology and preferred embodiments implemented for the present invention are described in the following paragraphs accompanying the appended drawings for persons skilled in this art to well appreciate the features of the claimed invention.

BRIEF DESCRIPTION OF THE DRAWINGS

FIGS. 7A-7B depict schematic views of the uplink out-of-order configurations according to the present invention.

DETAILED DESCRIPTION

In the following description, the present invention will be explained with reference to certain example embodiments thereof. These example embodiments are not intended to limit the present invention to any particular environment, examples, applications, embodiments or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

The first embodiment of the present invention is as shown in FIGS. 1A-1B, 2A-2B, 3A-3B, 4A-4B, 5A-5B and 6A-6B. In this embodiment, for simplification of the description, only the signal transmissions between a single UE 1 and a BS 2 connected thereto are depicted as the examples to describe how the UE 1 decides the uplink signal transmission according to the condition of the resource configuration when the BS 2 configures the uplink resource out of order. The components and the functions of the components relevant to the UE 1 and BS 2 will be further described in the embodiments corresponding to FIG. 9 and FIG. 10. It shall be appreciated by those of ordinary skill in the art that the BS 2 can also perform the signal transmissions with other UEs and executes the similar transmission operations with the other UEs, at the same time and thus it will not be further described herein.

The UE 1 and BS 2 are adapted for a wireless communication which may be the next generation of mobile communication system (broadly called 5G mobile communication system currently) or any mobile communication systems based on the orthogonal frequency division multiple access (OFDMA) technology. The following description is based on the 5G mobile communication system to illustrate the present invention; however, how to extend the technical means of the present invention to be applied to other OFDMA-based mobile communication systems shall be appreciated by those of ordinary skill in the art, and thus will be not further described herein.

Figure 1A:
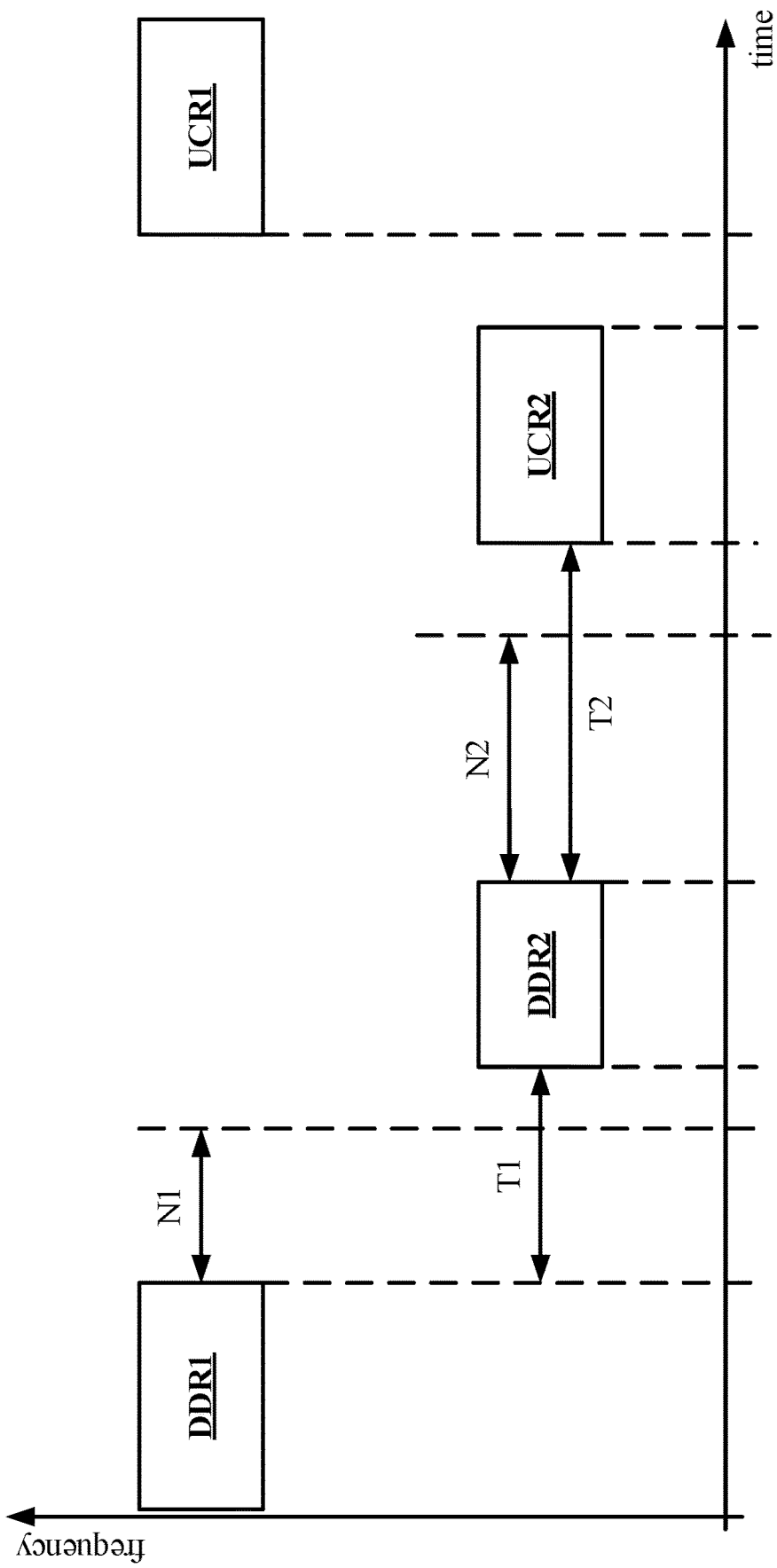
FIGS. 1A-1B depict schematic views of the uplink out-of-order configurations according to the present invention.
Figure 1B:
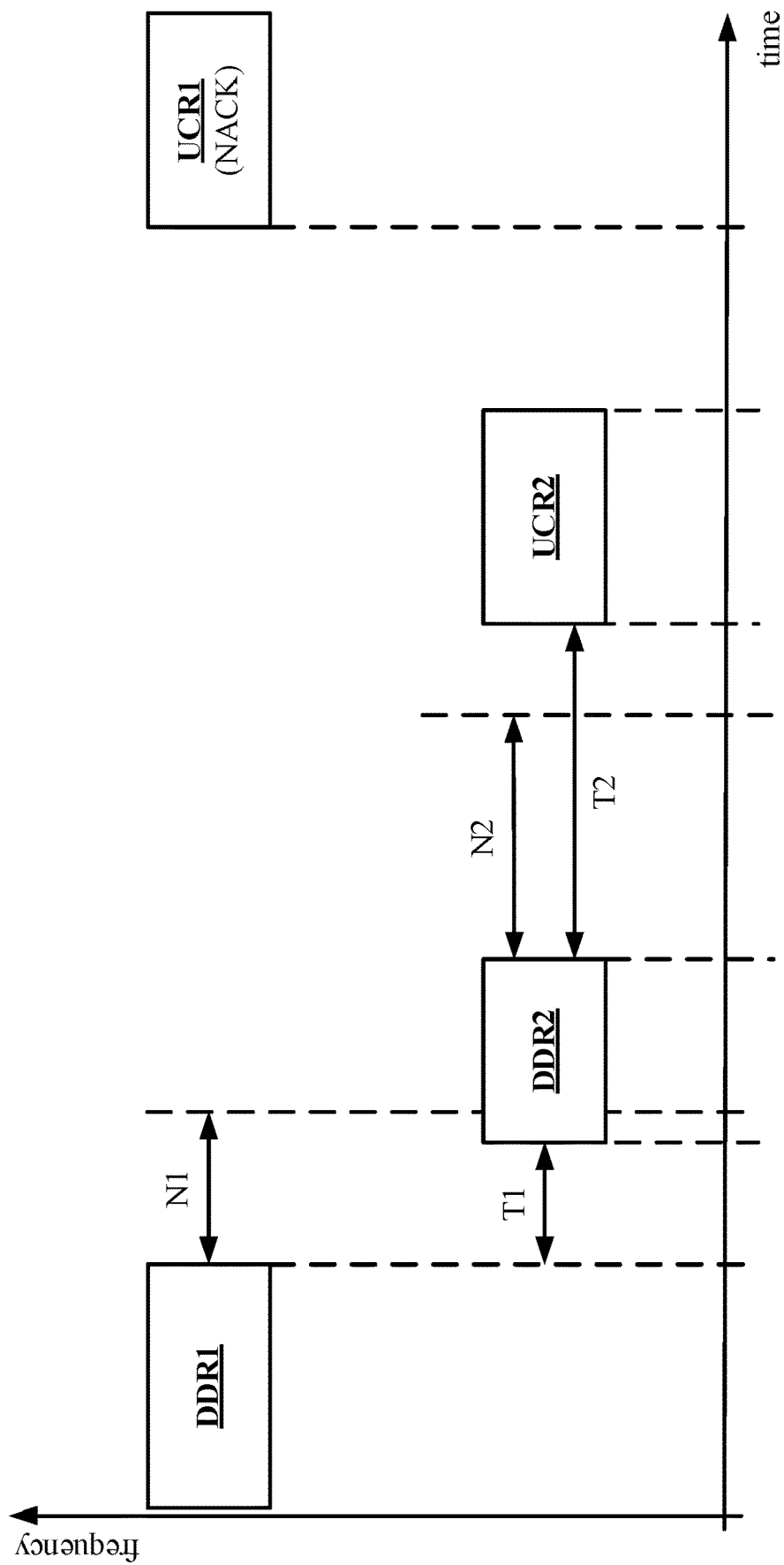

For example, FIGS. 1A-1B depict schematic views of the uplink out-of-order configurations according to the present invention. The UE 1 receives first downlink control information (DCI) (not shown) on a first physical downlink control channel (PDCCH) resource (not shown) from the BS 2. The first DCI indicates a first physical downlink shared channel (PDSCH) resource DDR1 and a first physical uplink control channel (PUCCH) resource UCR1. After receiving the first DCI, the UE 1 further receives second DCI (not shown) on a second PDCCH resource (not shown) from the BS 2. The second DCI indicates a second PDSCH resource DDR2 and a second PUCCH resource UCR2. The second PUCCH resource UCR2 is configured by the BS 2 to be advanced to the first PUCCH resource UCR1 in the time domain based on the uplink out-of-order configurations.

Here, it assume that the first PDSCH resource DDR1 and the first PUCCH resource UCR1 belongs to the eMBB service, and the second PDSCH resource DDR2 and the second PUCCH resource UCR2 belong to the URLLC service. Since the URLLC service is mainly used for the vehicle communication, the industrial control and any applications having high reliable and low latency transmission requirement, if the BS 2 configures the second PUCCH resource UCR2 with respect to the URLLC service in order based on the prior art, the earliest timing that the UE 1 is able to transmit the feedback message relevant to the URLLC service would be postponed and will incur high latency. As a result, in order to meet the URLLC service requirement, the BS 2 of the present invention configures the second PUCCH resource UCR2 to be advanced to the first PUCCH resource UCR1 in time domain based on the uplink out-of-order configurations, as shown in FIGS. 1A-1B, so that the UE 1 is able to preferentially process the second downlink data signal (not shown) on the second PDSCH resource DDR2, And then, the UE 1 transmits the feedback of the processing result to the BS 2 within the shortest possible time after the processing of the second downlink data signal is completed. However, since the UE 1 must preferentially process the second downlink data signal on the second PDSCH resource DDR2 to make sure of transmitting the feedback of the processing result on the second PUCCH resource UCR2, how the UE 1 to deal with such instantaneous transmission for urgency (i.e., how to process the first downlink data signal (not shown) on the first PDSCH resource) becomes important. In the present invention, the UE 1 determines whether to continue processing the first downlink data signal on the first PDSCH resource DDR1 according to whether the relative position relationship among at least two of the first PDSCH resource DDR1, the second PDSCH resource DDR2, the first PUCCH resource UCR1 and the second PUCCH resource UCR2 in the time domain meets a processing criterion.

Specifically, the UE 1 can determine whether to continue processing the first downlink data signal by evaluating if the time to process the first downlink data signal is enough according to one of the time interval between the first PDSCH resource DDR1 and the second PDSCH resource DDR2, the time interval between the first PUCCH resource UCR1 and the second PUCCH resource UCR2, the time interval between the first PDSCH resource DDR1 and the first PUCCH resource UCR1, the time interval between the first PDSCH resource DDR1 and the second PUCCH resource UCR2, the time interval between the second PDSCH resource DDR2 and the first PUCCH resource UCR1, and the time interval between the second PDSCH resource DDR2 and the second PUCCH resource UCR2.

In the implementation scenarios of FIGS. 1A-1B, the UE 1 uses the time interval T1 between the first PDSCH resource DDR1 and the second PDSCH resource DDR2 as a basis for determination, and takes that the processing time N1 for processing the first downlink data signal is shorter than the time interval T1 as a processing criterion. It shall be noted that the time interval T1 is calculated from the end of the first PDSCH resource DDR1 to the start of the second PDSCH resource DDR2.

If the processing time N1 (e.g., the duration of eight OFDM symbols) of the first downlink data signal is shorter than the time interval T1 (e.g., the duration of ten OFDM symbols) between the first PDSCH resource DDR1 and the second PDSCH resource DDR2, it means that the UE 1 is able to decode the first downlink data signal before receiving the second downlink data signal. Consequently, the UE 1 decides to continue processing the first downlink data signal and generates a first hybrid automatic repeat request acknowledgement (HARQ-ACK) message according to the whole processing result of the first downlink data signal. When the first downlink data signal is correctly decoded, the first HARQ-ACK message indicates that the first downlink data signal is correctly received (i.e., ACK). Conversely, when the first downlink data signal is incorrectly decoded, the first HARQ-ACK message indicates that the first downlink data signal is erroneously received (i.e., NACK). It shall be noted that the processing time of the downlink data signal may include the required processing time for channel estimation, demodulation and decoding.

It shall be understood that the BS 2 would take the UE capability of the UE 1, the processing time N2 (i.e., the duration of three OFDM symbols) of the second downlink data signal, and the time interval T2 between the second PDSCH resource DDR2 and the second PUCCH resource UCR2 into consideration when configuring the second PDSCH resource DDR2 and the second PUCCH resource UCR2 to make the time interval T2 absolutely longer than the processing time N2 (e.g., the time interval T2 must be longer than the duration of three OFDM symbols). It shall be noted that the time interval T2 is calculated from the end of the second PDSCH resource DDR2 to the start of the second PUCCH resource UCR2.

As the BS 2 configures the second PUCCH resources UCR2 under the uplink out-of-order configuration, no matter whether the processing of the first downlink data signal will be continued, the UE 1 has to preferentially process the second downlink data signal on the second PDSCH resource DDR2, generate the second HARQ-ACK message according to a processing result of the second downlink data signal, and transmit the second HARQ-ACK message on the second PUCCH resource UCR2 to the BS 2. When the second downlink data signal is correctly decoded, the second HARQ-ACK message indicates that the second downlink data signal is correctly received (i.e., ACK). Conversely, when the second downlink data signal is incorrectly decoded, the second HARQ-ACK message indicates that the second downlink data signal is erroneously received (i.e., NACK). Afterwards, the UE 1 transmits the first HARQ-ACK message on the first PUCCH resource UCR1 to the BS 2 after transmitting the second HARQ-ACK message.

If the UE 1 determines that the processing time N1 of the first downlink data signal is longer than the time interval T1 between the first PDSCH resource DDR1 and the second PDSCH resource DDR2, then the UE 1 decides not to continue processing the first downlink data signal. In this case, the UE 1 generates the first HARQ-ACK message according to the current processing result of the first downlink data signal. In detail, in the embodiment, when the UE 1 decides not to continue processing the first downlink data signal, the UE 1 will drop the first downlink data signal directly and generates the first HARQ-ACK message indicating that the first downlink data signal is erroneously received (i.e., NACK), as shown in FIG. 1B. Under such circumstances, after receiving the first HARQ-ACK message, the BS 2 will re-transmit the first downlink data signal to the UE 1 in response to the NACK indicated by the first HARQ-ACK message. In other words, when the UE 1 decides not to continue processing the first downlink data signal since the relative position relationship between the first PDSCH resource DDR1 and the second PDSCH resource DDR2 in the time domain does not meet the processing criterion, the first HARQ-ACK message indicates that the first downlink data signal is incorrectly decoded.

Figure 2A:
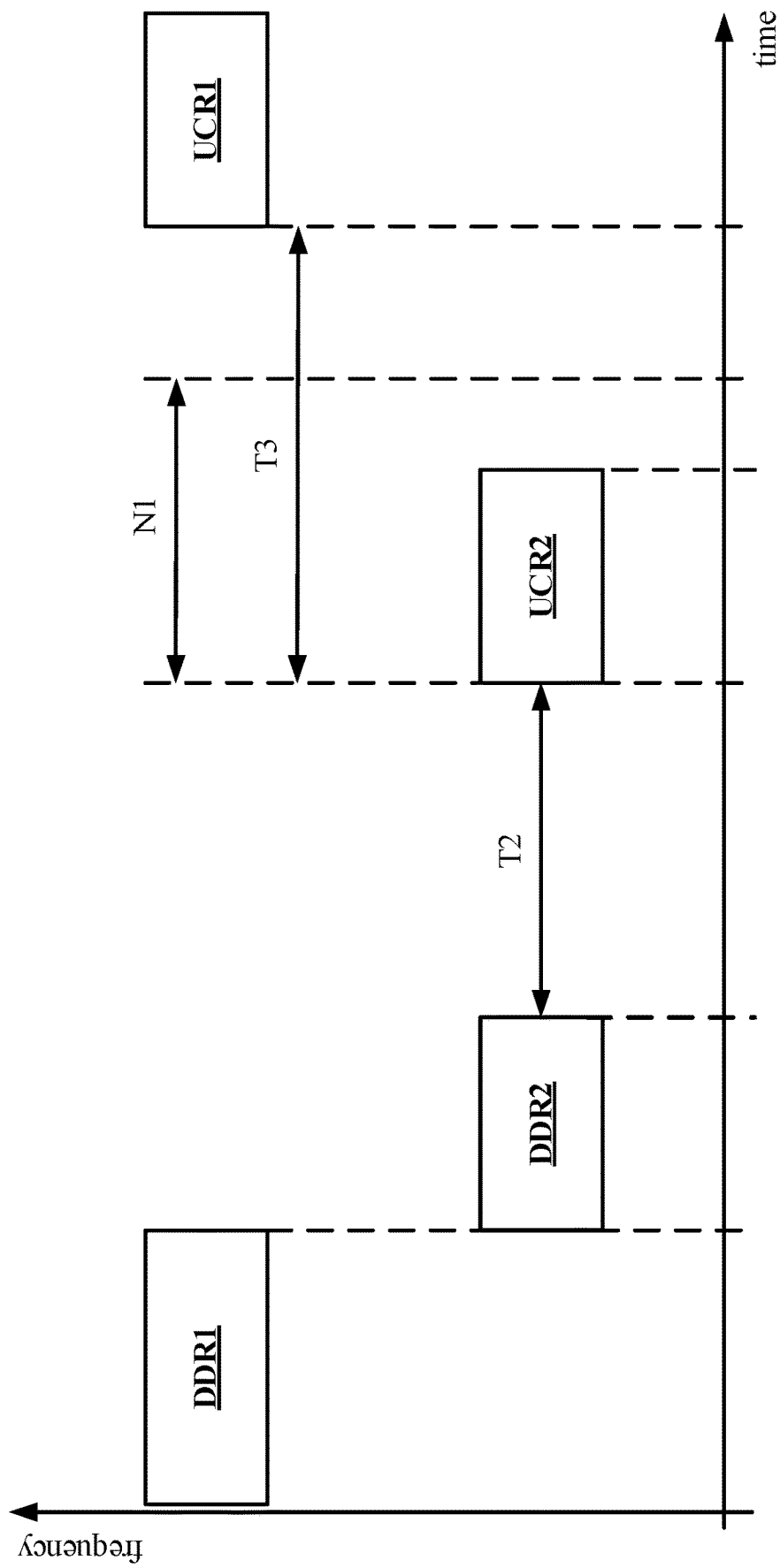
FIGS. 2A-2B depict schematic views of the uplink out-of-order configurations according to the present invention.
Figure 2B:
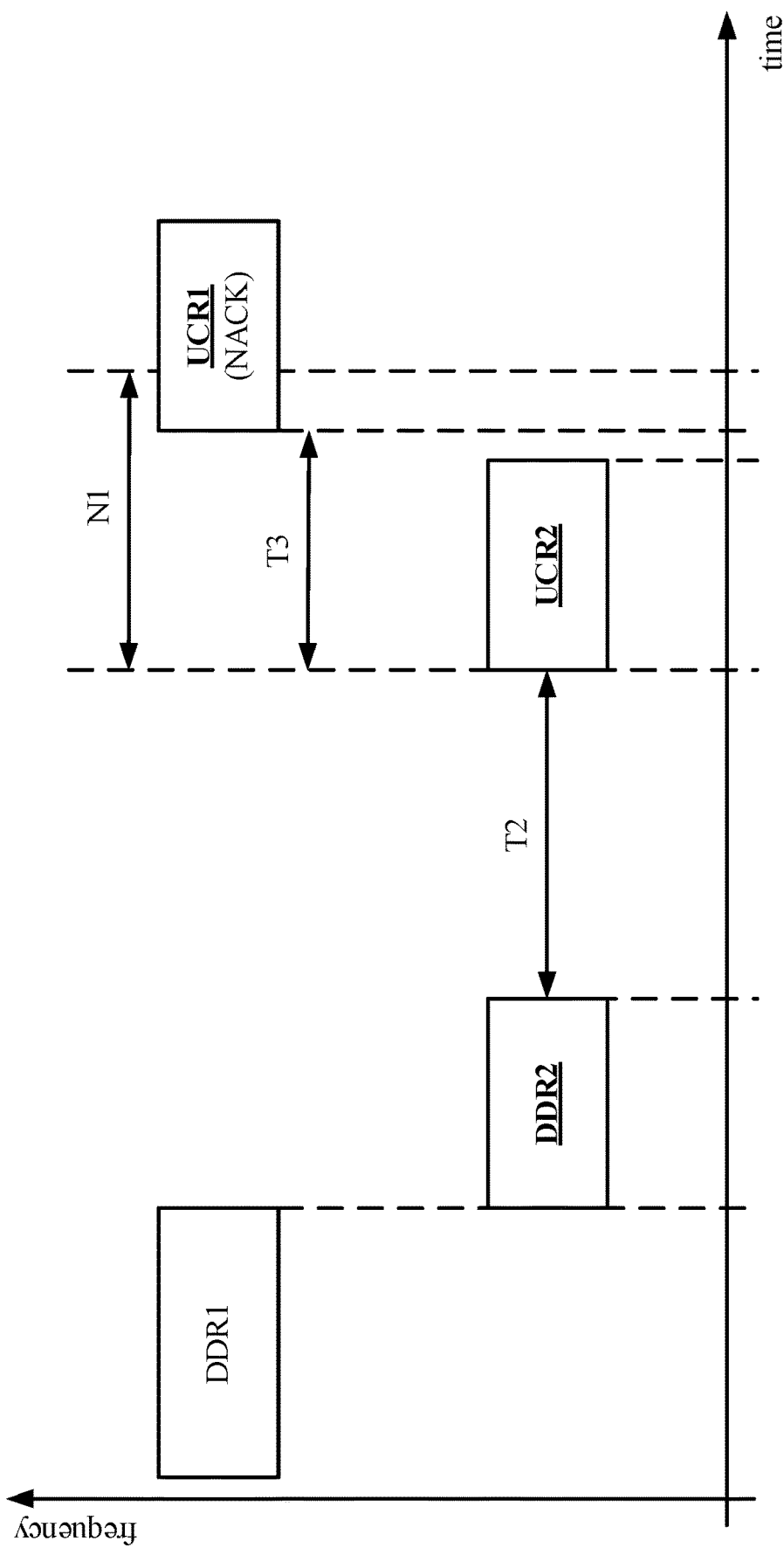

In the implementation scenarios of FIGS. 2A-2B, the BS 2 immediately transmits the second downlink data signal on the second PDSCH resource DDR2 after transmitting the first downlink data signal on the first PDSCH resource DDR1. In this embodiment, the UE 1 uses the time interval T3 between the first PUCCH resource UCR1 and the second PUCCH resource UCR2 as a basis for determination, and takes that the processing time N1 of the first downlink data signal is shorter than the time interval T3 between the first PUCCH resource UCR1 and the second PUCCH resource UCR2 as a processing criterion. It shall be noted that the time interval T3 is calculated from the start of the second PUCCH resource UCR2 to the start of the first PUCCH resource UCR1.

If the processing time N1 of the first downlink data signal is shorter than the time interval T3 between the first PUCCH resource UCR1 and the second PUCCH resource UCR2, it means that the UE 1 has enough time to decode the first downlink data signal and generate the first HARQ-ACK message based on the decoding result so that the UE 1 decides to continue processing the first downlink data signal and generates the first HARQ-ACK message according to the whole processing result of the first downlink data signal, as shown in FIG. 2A. Further speaking, it shall be appreciated by those of ordinary skill in the art that UE 1 needs not to wait for the finish of transmitting the second HARQ-ACK message on the second PUCCH resource UCR2 and then starts processing the first downlink data signal. That is to say, the UE 1 may process part of the first downlink data signal after receiving the first downlink data signal on the first PDSCH resource DDR1 and before completely receiving the second downlink data signal on the second PDSCH resource DDR2. As a result, this embodiment considers that even the UE 1 needs to wait for the finish of transmitting the second HARQ-ACK message on the second PUCCH resource UCR2 and then starts processing the first downlink data signal, the UE 1 still has enough processing time to decode the first downlink data signal and generate the first HARQ-ACK message based on the decoding result as long as the processing time N1 is shorter than the time interval T3.

However, as shown in FIG. 2B, if the UE 1 determines the processing time N1 is longer than the time interval T3 between the first PUCCH resource UCR1 and the second PUCCH resource UCR2, the UE 1 will determine that it might not have enough time to completely decode the first downlink data signal and generate the first HARQ-ACK message based on the decoding result. Thus, the UE 1 will decide not to continue processing the first downlink data signal and will generate the first HARQ-ACK message indicating the first downlink data signal is erroneously received (i.e., NACK) according to the current processing result of the first downlink data signal. In other words, when the UE 1 decides not to continue processing the first downlink data signal since the relative position relationship between the first PUCCH resource UCR1 and the second PUCCH resource UCR2 in the time domain does not meet the processing condition, the first HARQ-ACK message indicates that the first downlink data signal is incorrectly decoded.

Figure 3A:
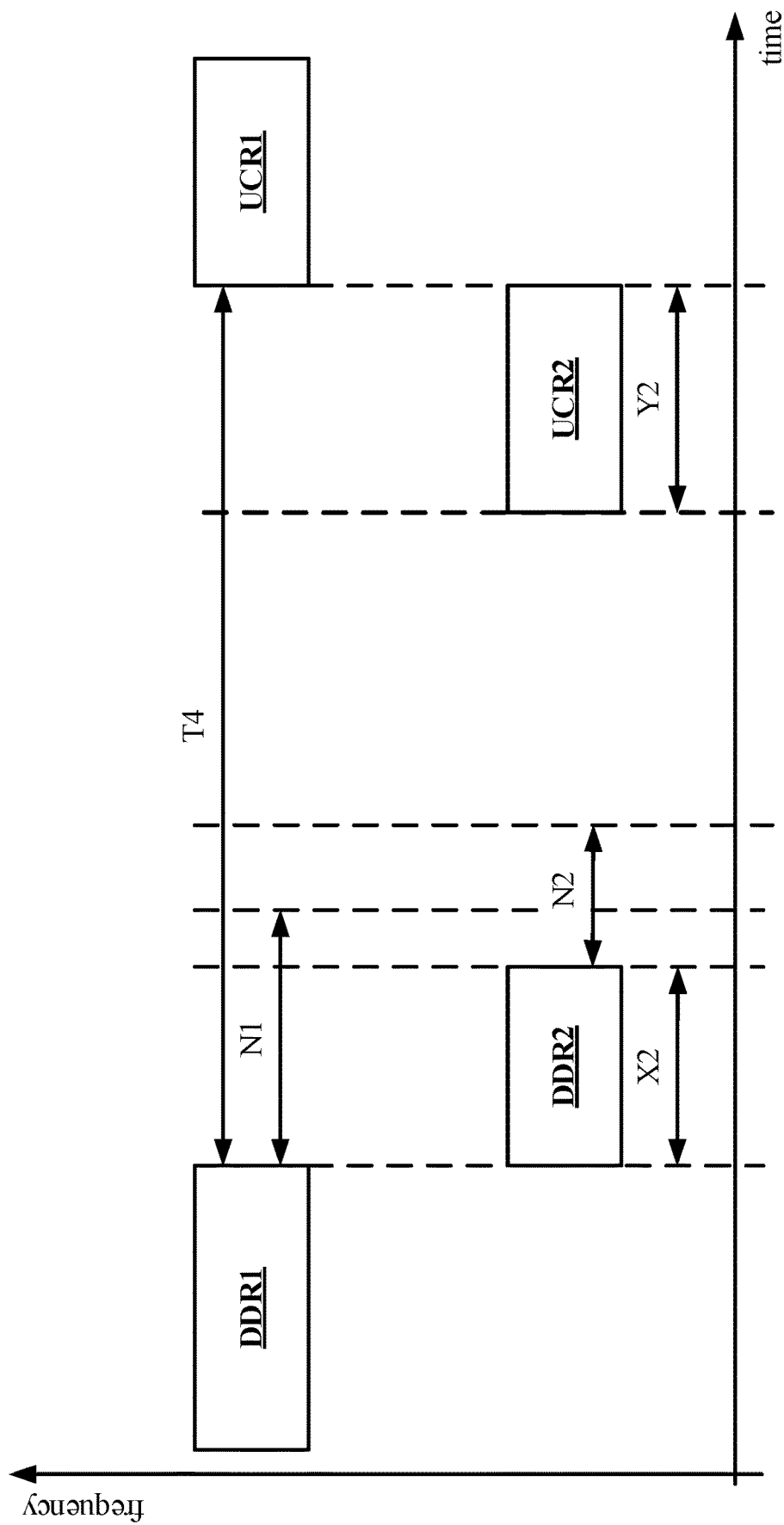
FIGS. 3A-3B depict schematic views of the uplink out-of-order configurations according to the present invention.
Figure 3B:
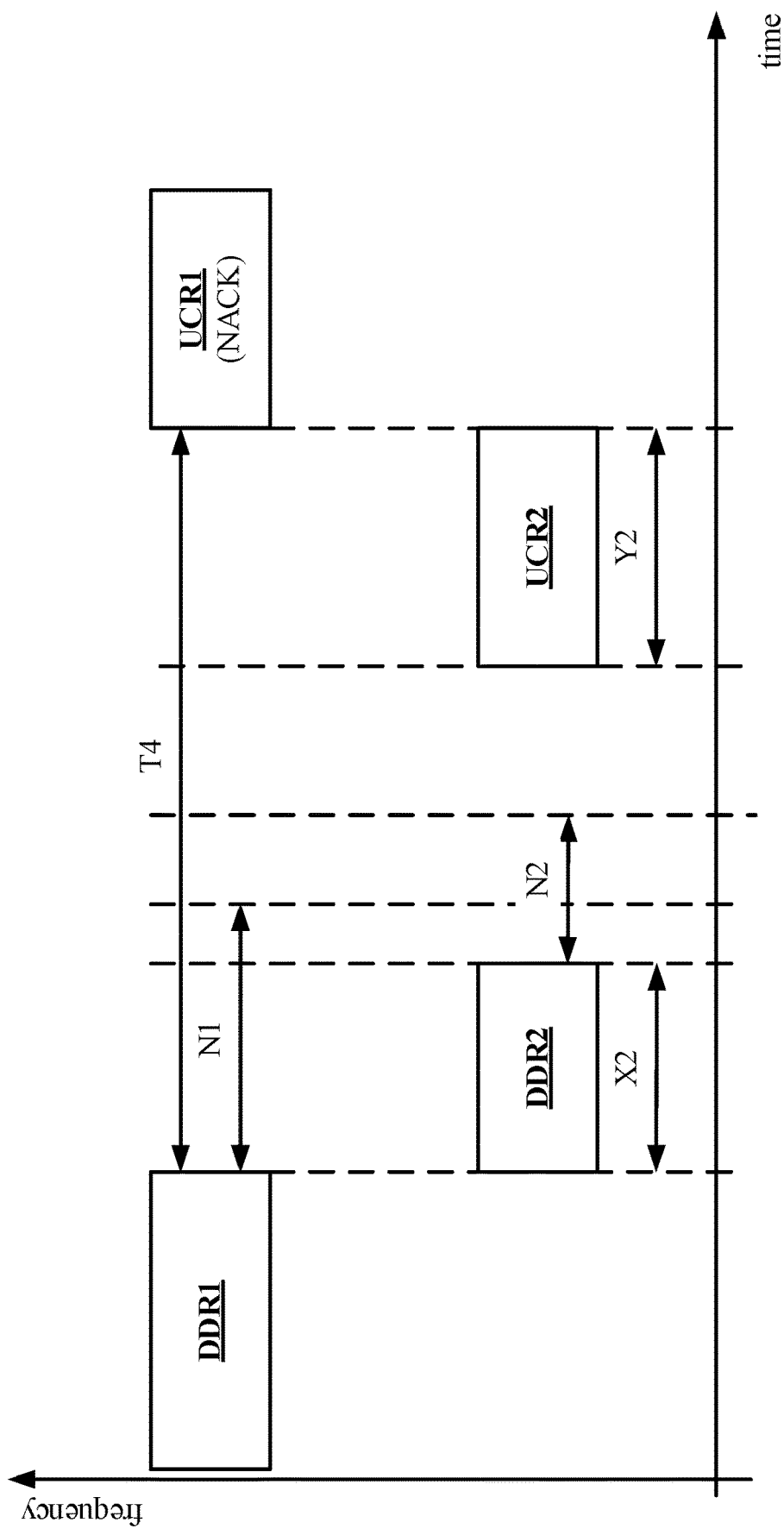

In the implementation scenarios of FIGS. 3A-3B, not only the first PDSCH resource DDR1 is adjacent to the second PDSCH resource DDR2 in the time domain, the first PUCCH resource UCR1 is adjacent to the second PUCCH resource UCR2 in the time domain as well. In this embodiment, the UE 1 uses the time interval T4 between the first PDSCH resource DDR1 and the first PUCCH resource UCR1 as a basis for determination, and takes that the time interval T4 between the first PDSCH resource DDR1 and the first PUCCH resource UCR1 is longer than the sum of the processing time N1 of the first downlink data signal, the receiving time X2 of the second downlink data signal, the processing time N2 of the second downlink data signal and the transmitting time Y2 of the second HARQ-ACK message as a processing criterion. It shall be noted that the time interval T4 is calculated from the end of the first PDSCH resource DDR1 to the start of the first PUCCH resource UCR1.

As shown in FIG. 3A, if the time interval T4 between the first PDSCH resource DDR1 and the first PUCCH resource UCR1 is longer than the sum of the processing time N1 of the first downlink data signal, the receiving time X2 of the second downlink data signal, the processing time N2 of the second downlink data signal and the transmitting time Y2 of the second HARQ-ACK message, it means that the UE 1 still has enough time to completely decode the first downlink data signal after decoding the second downlink data signal so that the UE 1 decides to continue processing the first downlink data signal and generates the first HARQ-ACK message according to the whole processing result of the first downlink data signal.

If the UE 1 determines that the time interval T4 between the first PDSCH resource DDR1 and the first PUCCH resource UCR1 is shorter than the sum of the processing time N1 of the first downlink data signal, the receiving time X2 of the second downlink data signal, the processing time N2 of the second downlink data signal and the transmitting time Y2 of the second HARQ-ACK message, the UE 1 will determine that it might not have enough time to completely decode the first downlink data signal after decoding the second downlink data signal. Thus, the UE 1 will decide not to continue processing the first downlink data signal and will generate the first HARQ-ACK message indicating the first downlink data signal is erroneously received (i.e., NACK) according to the current processing result of the first downlink data signal, as shown in FIG. 3B. In other words, when the UE 1 decides not to continue processing the first downlink data signal since the relative position relationship between the first PDSCH resource DDR1 and the first PUCCH resource UCR1 in the time domain does not meet the processing condition, the first HARQ-ACK message indicates that the first downlink data signal is incorrectly decoded.

Figure 4A:
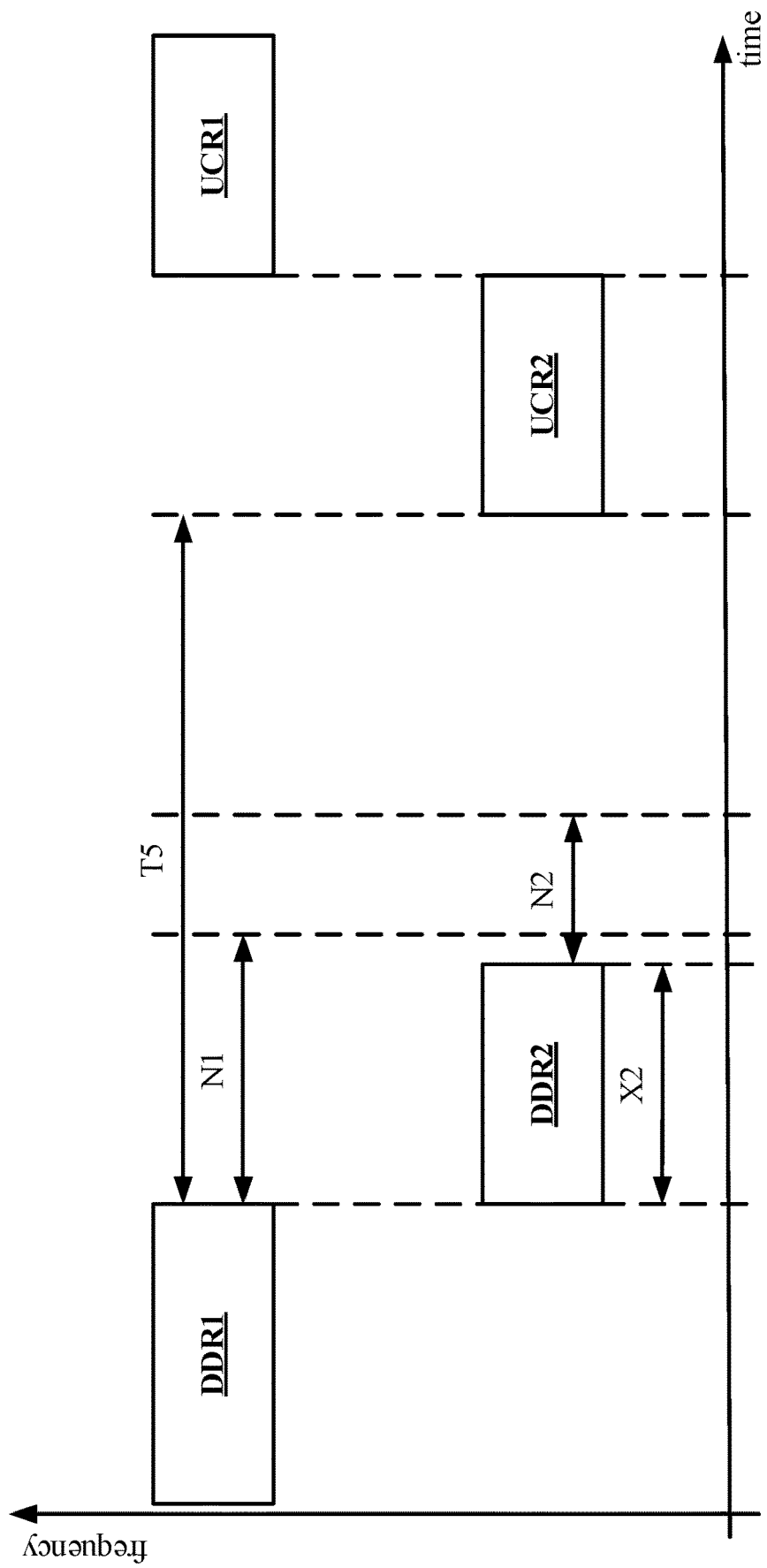
FIGS. 4A-4B depict schematic views of the uplink out-of-order configurations according to the present invention.
Figure 4B:
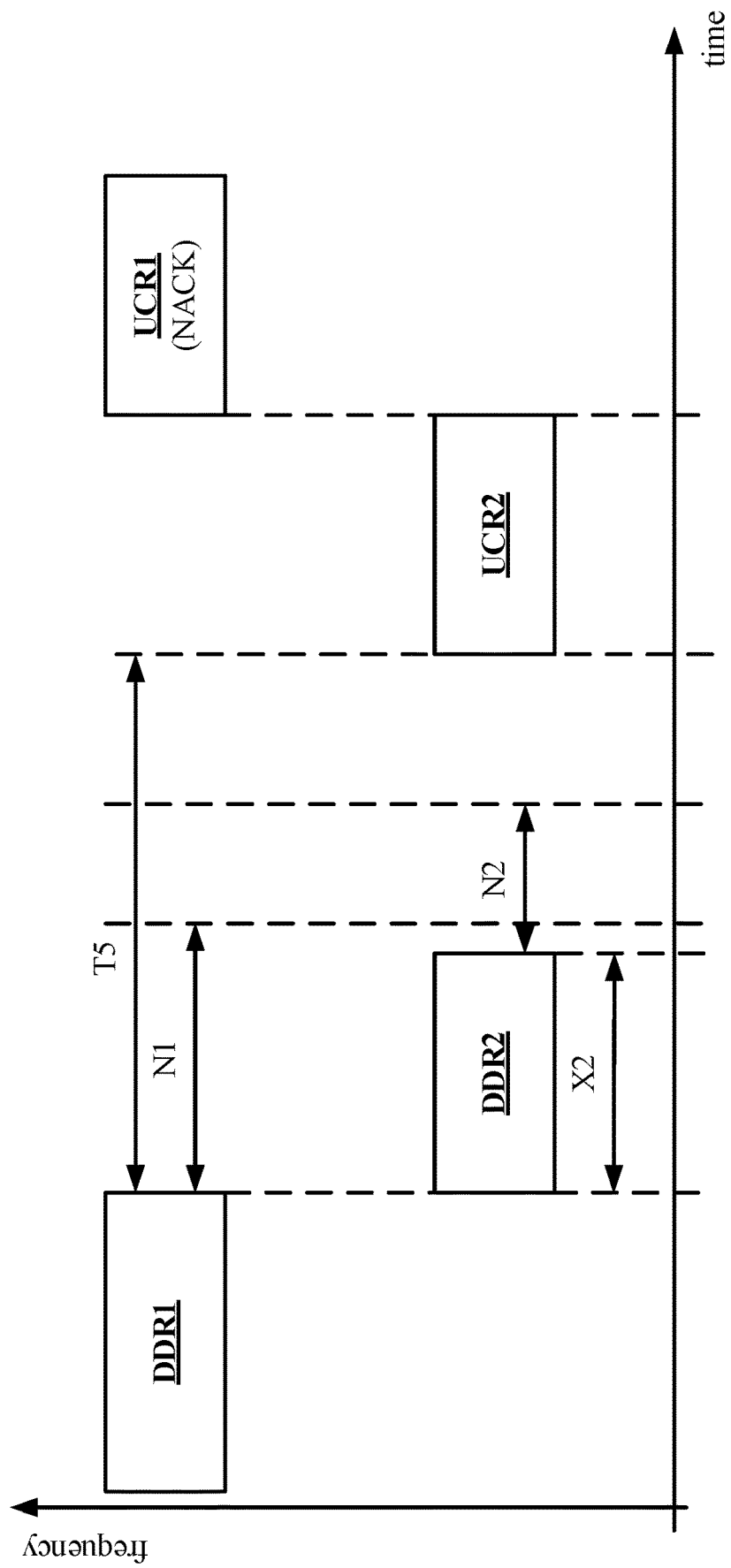

Unlike the implementation scenarios of FIGS. 3A-3B, in the implementation scenarios of FIGS. 4A-4B, the UE 1 uses the time interval T5 between the first PDSCH resource DDR1 and the second PUCCH resource UCR2 as a basis for determination, and takes that the time interval T5 between the first PDSCH resource DDR1 and the second PUCCH resource UCR2 is longer than the sum of the processing time N1 of the first downlink data signal, the receiving time X2 of the second downlink data signal, and the processing time N2 of the second downlink data signal as a processing criterion. It shall be noted that the time interval T5 is calculated from the end of the first PDSCH resource DDR1 to the start of the second PUCCH resource UCR2.

In FIG. 4A, if the time interval T5 between the first PDSCH resource DDR1 and the second PUCCH resource UCR2 is longer than the sum of the processing time N1 of the first downlink data signal, the receiving time X2 of the second downlink data signal, and the processing time N2 of the second downlink data signal, it means that the UE 1 still has enough time to completely decode the first downlink data signal after decoding the second downlink data signal so that the UE 1 decides to continue processing the first downlink data signal and generates the first HARQ-ACK message according to the whole processing result of the first downlink data signal.

In FIG. 4B, if the time interval T5 between the first PDSCH resource DDR1 and the second PUCCH resource UCR2 is shorter than the sum of the processing time N1 of the first downlink data signal, the receiving time X2 of the second downlink data signal, and the processing time N2 of the second downlink data signal, the UE 1 will determine that it might not have enough time to completely decode the first downlink data signal after decoding the second downlink data signal. Thus, the UE 1 will decide not to continue processing the first downlink data signal and will generate the first HARQ-ACK message indicating the first downlink data signal is erroneously received (i.e., NACK) according to the current processing result of the first downlink data signal. In other words, when the UE 1 decides not to continue processing the first downlink data signal since the relative position relationship between the first PDSCH resource DDR1 and the second PUCCH resource UCR2 in the time domain does not meet the processing condition, the first HARQ-ACK message indicates that the first downlink data signal is incorrectly decoded.

Figure 5A:
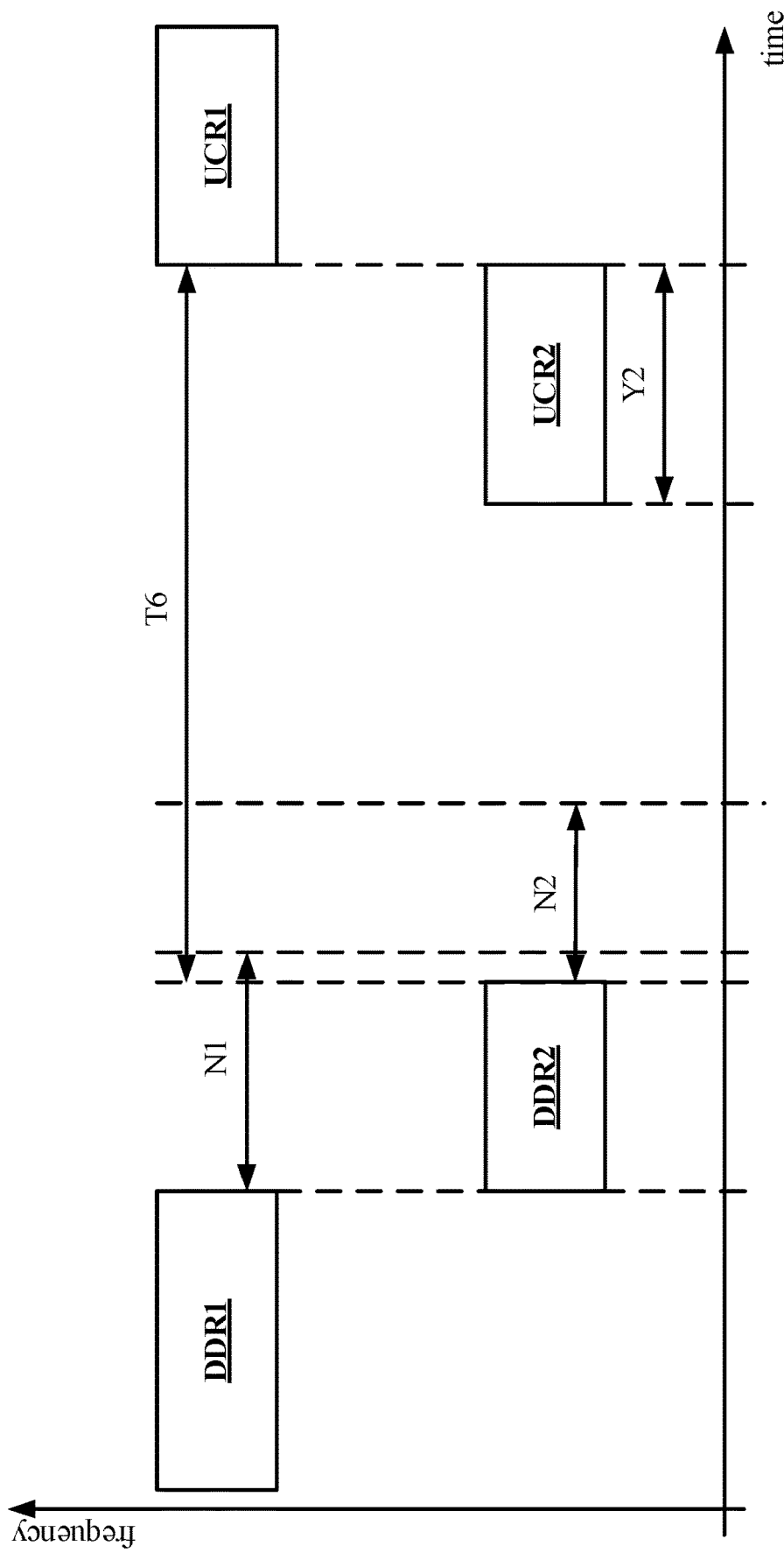
FIGS. 5A-5B depict schematic views of the uplink out-of-order configurations according to the present invention.
Figure 5B:
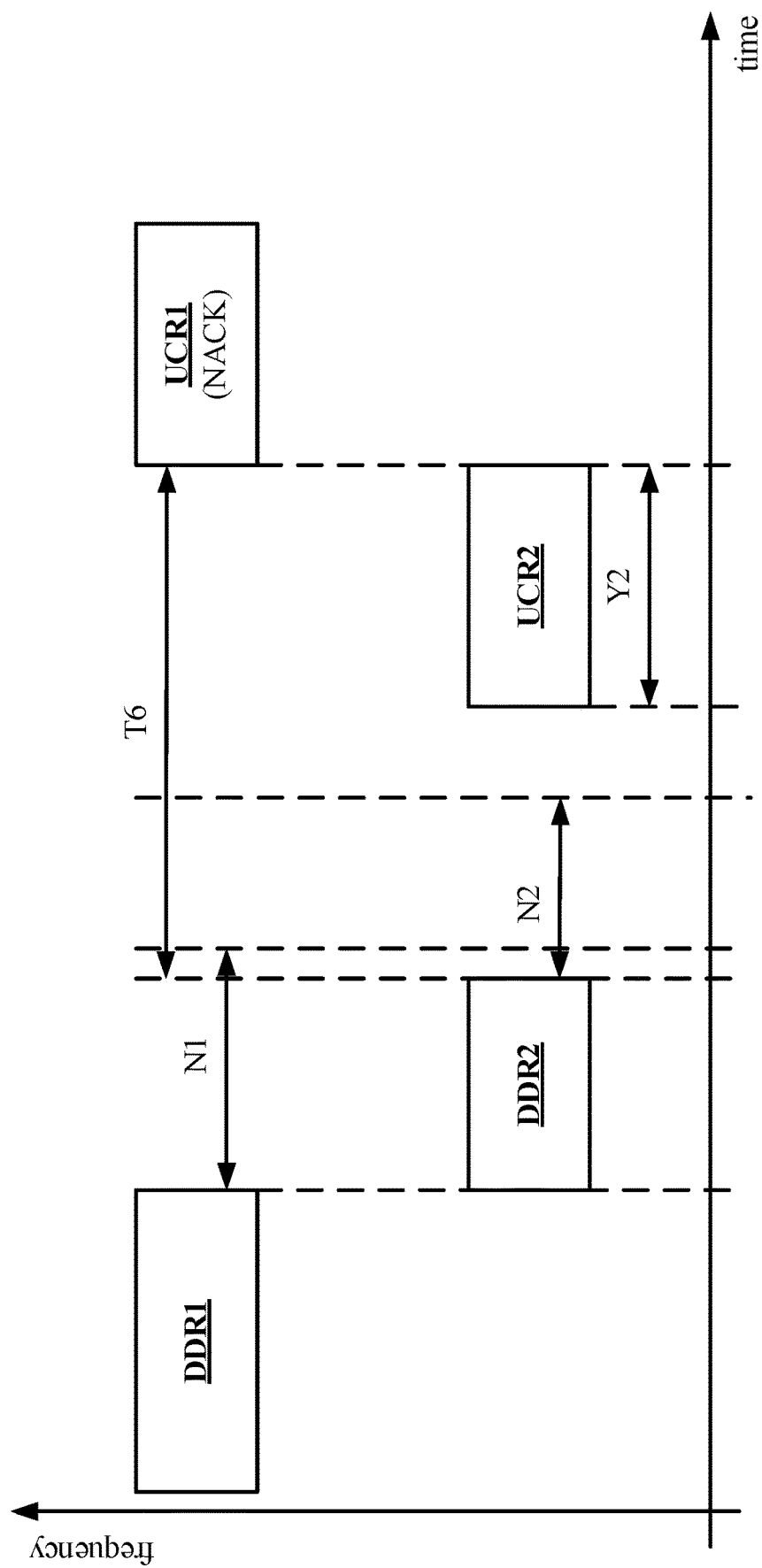

Unlike the implementation scenarios of FIGS. 3A-3B and FIGS. 4A-4B, in the implementation scenarios of FIGS. 5A-5B, the UE 1 uses the time interval T6 between the second PDSCH resource DDR2 and the first PUCCH resource UCR1 as a basis for determination, and takes that the time interval T6 between the second PDSCH resource DDR2 and the first PUCCH resource UCR1 is longer than the sum of the processing time N1 of the first downlink data signal, the processing time N2 of the second downlink data signal and the transmitting time Y2 of the second HARQ-ACK message as a processing criterion. It shall be noted that the time interval T6 is calculated from the end of the second PDSCH resource DDR2 to the start of the first PUCCH resource UCR1.

In FIG. 5A, if the time interval T6 between the second PDSCH resource DDR2 and the first PUCCH resource UCR1 is longer than the sum of the processing time N1 of the first downlink data signal, the processing time N2 of the second downlink data signal and the transmitting time Y2 of the second HARQ-ACK message, and, it means that the UE 1 still has enough time to completely decode the first downlink data signal after decoding the second downlink data signal so that the UE 1 decides to continue processing the first downlink data signal and generates the first HARQ-ACK message according to the whole processing result of the first downlink data signal.

In FIG. 5B, if the time interval T6 between the second PDSCH resource DDR2 and the first PUCCH resource UCR1 is shorter than the sum of the processing time N1 of the first downlink data signal, the processing time N2 of the second downlink data signal and the transmitting time Y2 of the second HARQ-ACK message, the UE 1 will determine that it might not have enough time to completely decode the first downlink data signal after decoding the second downlink data signal. Thus, the UE 1 will decide not to continue processing the first downlink data signal and will generate the first HARQ-ACK message indicating the first downlink data signal is erroneously received (i.e., NACK) according to the current processing result of the first downlink data signal. In other words, when the UE 1 decides not to continue processing the first downlink data signal since the relative position relationship between the second PDSCH resource DDR2 and the first PUCCH resource UCR1 in the time domain does not meet the processing condition, the first HARQ-ACK message indicates that the first downlink data signal is incorrectly decoded.

Figure 6A:
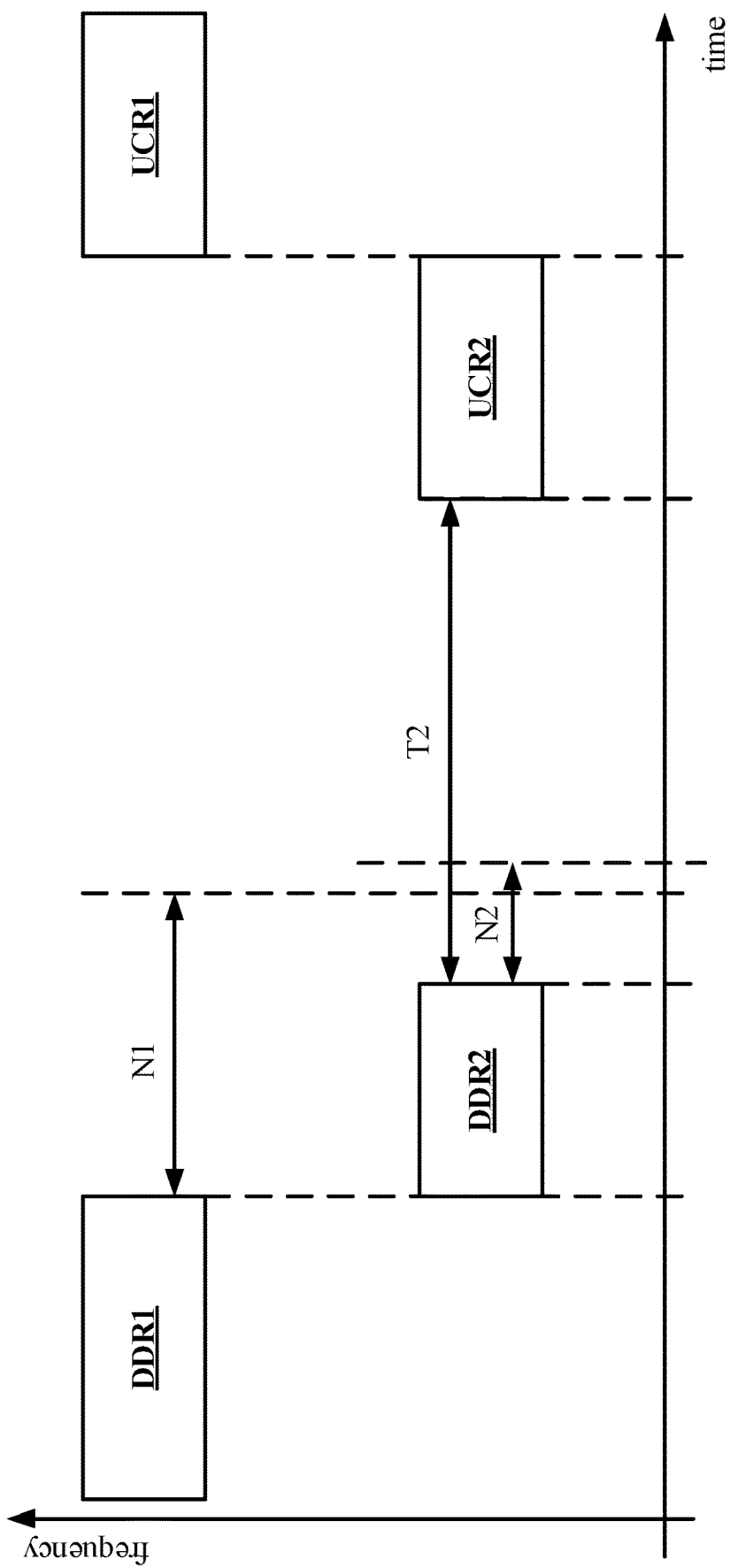
FIGS. 6A-6B depict schematic views of the uplink out-of-order configurations according to the present invention.
Figure 6B:
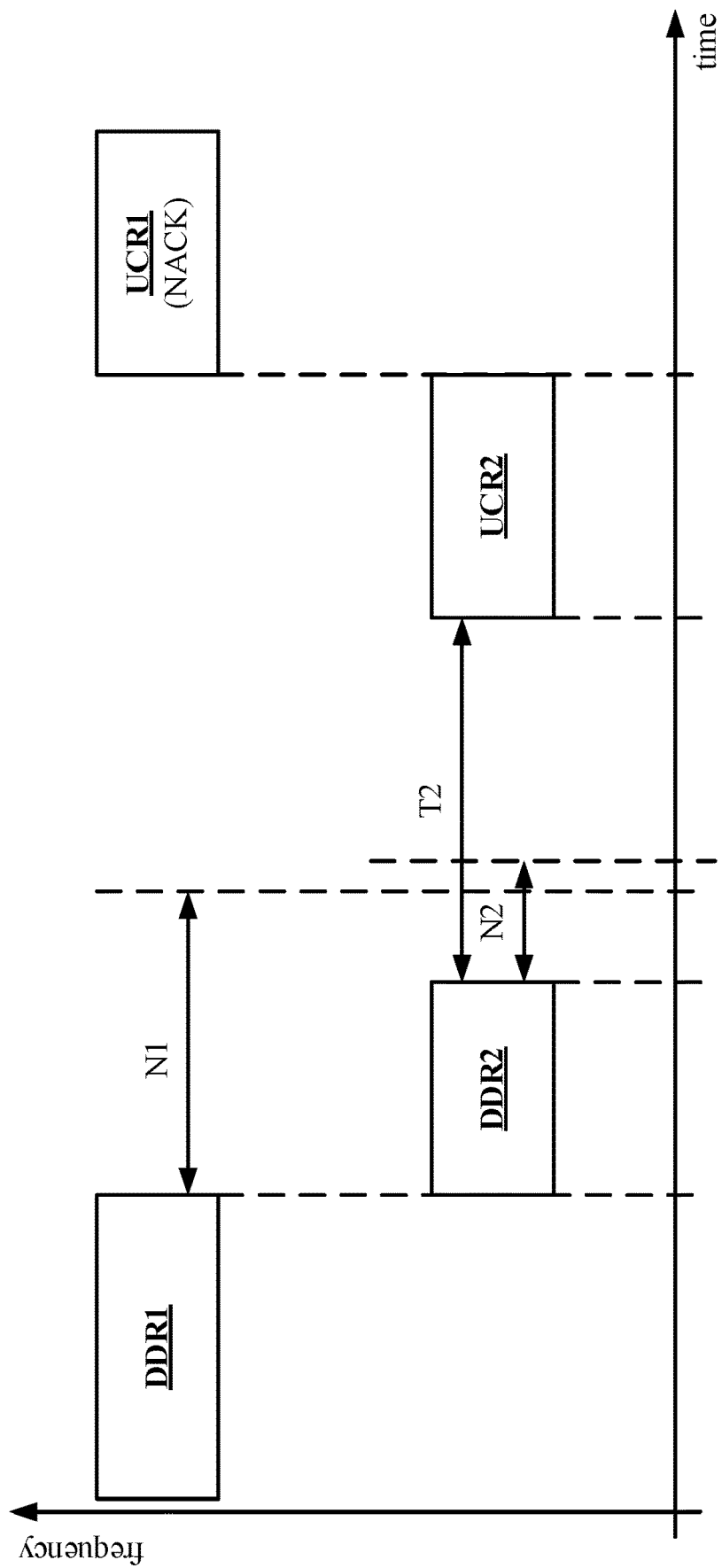

Unlike the implementation scenarios of FIGS. 3A-3B, FIGS. 4A-4B and FIGS. 5A-5B, in the implementation scenarios of FIGS. 6A-6B, the UE 1 uses the time interval T2 between the second PDSCH resource DDR2 and the second PUCCH resource UCR2 as a basis for determination, and takes that the time interval T2 between the second PDSCH resource DDR2 and the second PUCCH resource UCR2 is longer than the sum of the processing time N1 of the first downlink data signal and the processing time N2 of the second downlink data signal as a processing criterion. It shall be noted that the time interval T2 is calculated from the end of the second PDSCH resource DDR2 to the start of the second PUCCH resource UCR2.

In FIG. 6A, if the time interval T2 between the second PDSCH resource DDR2 and the second PUCCH resource UCR2 is longer than the sum of the processing time N1 of the first downlink data signal and the processing time N2 of the second downlink data signal, it means that the UE 1 still has enough time to completely decode the first downlink data signal after decoding the second downlink data signal so that the UE 1 decides to continue processing the first downlink data signal and generates the first HARQ-ACK message according to the whole processing result of the first downlink data signal.

In FIG. 6B, if the time interval T2 between the second PDSCH resource DDR2 and the second PUCCH resource UCR2 is shorter than the sum of the processing time N1 of the first downlink data signal and the processing time N2 of the second downlink data signal, the UE 1 will determine that it might not have enough time to completely decode the first downlink data signal after decoding the second downlink data signal. Thus, the UE 1 will decide not to continue processing the first downlink data signal and will generate the first HARQ-ACK message indicating the first downlink data signal is erroneously received (i.e., NACK) according to the current processing result of the first downlink data signal. In other words, when the UE 1 decides not to continue processing the first downlink data signal since the relative position relationship between the second PDSCH resource DDR2 and the second PUCCH resource UCR2 in the time domain does not meet the processing condition, the first HARQ-ACK message indicates that the first downlink data signal is incorrectly decoded.

In another embodiment, the UE 1 further receives a radio resource control (RRC) message carrying an uplink out-of-order transmission activation indicator from the BS 2. In this way, the UE 1 can learn that the BS 2 may configure uplink resource under the uplink out-of-order configuration according to the uplink out-of-order transmission activation indicator so as to decide the uplink signal transmission according to the condition of the resource configuration as illustrated in the foregoing implementation scenarios, Besides, in other embodiments, the UE 1 takes that the first PDSCH resource DDR1 is not at least partially overlapped with the second PDSCH resource DDR2 as a processing criterion. If the UE 1 determines that the first PDSCH resource DDR1 is at least partially overlapped with the second PDSCH resource DDR2 according to the relative position relationship in the time domain, the UE 1 will determine that the relative position relationship in the time domain does not meet the processing criterion and decide not to continue processing the first downlink data signal. In detail, if the BS 2 configures the second PDSCH resource DDR2, which is later configured, to be partially overlapped with the first PDSCH resource DDR1 in the time domain or in both the time and frequency domains, it means that the BS 2 considers the second downlink data signal is very important (i.e., the second downlink data signal has a higher priority) so that the UE 1 can drop the first downlink data signal directly without processing the first downlink data signal further.

The second embodiment is an extension of the first embodiment. In this embodiment, the UE 1 further calculates a delay element, additionally incurred by processing the first downlink data signal under the uplink out-of-order configuration, according to the relative position relationship in the time domain. In detail, since the UE 1 must preferentially process the second downlink data signal and the UE 1 may have processed part of the first downlink data signal after the finish of receiving the first downlink data signal and before the finish of receiving the second downlink data signal, the UE 1 needs additional operation time to suspend the first downlink data signal from the current processing, switch to process the second downlink data signal, and resume processing the first downlink data signal after the finish of processing the second downlink data signal.

The aforesaid additional operation time is the additionally incurred delay element. Therefore, the UE 1 should take the delay element into consideration as well so as to calculate a required processing time (i.e., the processing time N1) according to the delay element, and determines whether the relative position relationship in the time domain meets the processing criterion according to the required processing time. In other words, in the present invention, the processing time N1 of the first downlink data signal needs to further consider the influence caused by the uplink out-of-order configuration.

In other embodiment, the UE 1 may further determine whether the relative position relationship in the time domain meets the processing criterion according to at least one of a physical resource block (PRB) size, a subcarrier spacing (SCS), a demodulation reference signal (DMRS) position and a transport block (TB) size of the first PDSCH resource DDR1. Specifically, those of ordinary skill in the art could understand that the PRB size and TB size will determine the data amount of the downlink signal, the SCS will determine a period of one OFDM symbol, and the DMRS position will determine the start timing for performing channel estimation. Thus, these factors may be taken into consideration when calculating and estimating the processing time N1 of the first downlink data signal, and may be used for determining whether to continue processing the first downlink data signal accordingly.

The third embodiment is an extension of the first embodiment. In this embodiment, the first downlink data signal is composed of a plurality of code block groups (CBGs). Therefore, when the UE 1 decides not to continue processing the first downlink data signal, the UE 1 will further determine whether the CBGs include a decoded part and an undecoded part to generate the current processing result. In this case, the first HARQ-ACK message indicates a decoding result (i.e., ACK or NACK) of the decoded part and indicates that the undecoded part is incorrectly decoded (i.e., NACK).

As described in the first embodiment, the UE 1 may process part of the first downlink data signal first after the finish of receiving the first downlink data signal on the first PDSCH resource DDR1 and before the finish of receiving the second downlink data signal on the second PDSCH resource DDR2. Thus, the UE 1 should have a period of time to process some of CBGs, and reports the processing result of these processed CBGs through the first HARQ-ACK message. In other words, in this embodiment, when UE 1 decides not to continue processing the first downlink data signal since the relative position relationship in the time domain does not meet the processing criterion, the first HARQ-ACK message does not simply indicates whether the whole first downlink data signal is incorrectly or correctly decoded anymore; instead, the first HARQ-ACK message must indicate the processing result of these processed CBGs. By this way, for the subsequent re-transmission of the first downlink data signal, the BS 2 can only transmit the CBGs which are incorrectly decoded by the UE 1 or are undecoded by UE 1.

Please also refer to FIGS. 1A-1B, 2A-2B, 3A-3B, 4A-4B, 5A-5B and 6A-6B for the fourth embodiment of the present invention. The fourth embodiment is an extension of the first embodiment for further illustrate the operations of the BS 2. The BS 2 transmits the first DCI on the first PDCCH resource to the UE 1. The first DCI indicates the first PDSCH resource DDR1 and the first PUCCH resource UCR1. After transmitting the first DCI, the BS 2 transmits the second DCI on the second PDCCH resource to the UE 1. The second DCI indicates the second PDSCH resource DDR2 and the second PUCCH resource UCR2. The second PUCCH resource UCR2 is configured to be advanced to the first PUCCH resource UCR1 in the time domain based on the uplink out-of-order configurations.

As described in the first embodiment, it assume that the first PDSCH resource DDR1 and the first PUCCH resource UCR1 belongs to the eMBB service, and the second PDSCH resource DDR2 and the second PUCCH resource UCR2 belong to the URLLC service. The URLLC service is mainly used for the vehicle communication, the industrial control and any applications having high reliable and low latency transmission requirement. Thus, in order to meet the URLLC service requirement, the BS 2 of the present invention configures the second PUCCH resource UCR2 to be advanced to the first PUCCH resource UCR1 in the time domain based on the uplink out-of-order configurations to make the UE 1 able to preferentially process the second downlink data signal on the second PDSCH resource DDR2 and transmit the feedback of the processing result to the BS 2 within the shortest possible time after processing the second data downlink signal.

In the present invention, the UE 1 will report its UE capability to the BS 2. The UE capability includes a parallel processing capability and a PDSCH processing capability on each of a plurality of component carriers (CC). Moreover, the PDSCH processing capability on each component carrier shows what kind of PDSCH processing capability (e.g., supporting the processing capability of the shorter PDSCH or not, and supporting the processing capability of the longer PDSCH or not) the UE 1 support on the corresponding component carrier.

For example, the parallel processing capability may include a multiple carriers operating capability, but not limited thereto. When the BS 2 receives the UE capability report message indicating the UE capability, the BS 2 can determine whether the UE 1 is able to continue processing the first downlink data signal according to the UE capability. Further speaking, when having the parallel processing capability, the UE 1 may have a processor with multiple cores, and so is able to demodulate and decode the first and second data downlink signals at the same time through the processing capability of the multiple cores. Moreover, the UE 1 having the parallel processing capability is able to support the carrier Aggregation (CA) technique. Thus, when the first and second downlink data signals are respectively transmitted on the different carriers, the UE 1 is able to receive the first and second downlink data signals on the different carriers, respectively, and demodulate and decode them at the same time.

Furthermore, the first and second downlink data signals are transmitted on the same component carrier, the UE 1 is still able to demodulate and decode the first and second downlink data signals at the same time based on its PDSCH processing capability on each component carrier as long as the UE 1 has the parallel processing capability. For example, if the UE 1 supports the first PDSCH processing capability (e.g., supporting the processing capability of the longer PDSCH) on a first component carrier for processing the first downlink data signal, and supports the second PDSCH processing capability (e.g., supporting the processing capability of the shorter PDSCH) on a second component carrier for processing the second downlink data signal, the UE 1 can demodulate and decode the first downlink data signal based on the first PDSCH processing capability and demodulate and decode the second downlink data signal based on the second PDSCH processing capability at the same time when the first and second downlink data signals are transmitted on the second component carrier.

If the BS 2 determines that the UE 1 does not have the parallel processing capability, the BS 2 will also determine whether the UE 1 continues processing the first downlink data signal on the first PDSCH resource DDR1 according to whether the relative position relationship among at least two of the first PDSCH resource DDR1, the second PDSCH resource DDR2, the first PUCCH resource UCR1 and the second PUCCH resource UCR2 in the time domain meets the processing criterion. If the BS 2 determines that the UE 1 cannot finish processing the first downlink data signal, the BS 2 can prepare the subsequent re-transmission of the first downlink data signal in advance. In this case, when receiving the first HARQ-ACK message from the UE 1, the BS 1 may not decode the first HARQ-ACK message and re-transmit the first downlink data signal directly. The operations about how the BS 2 to determine whether the UE 1 continues processing the first downlink data signal on the first PDSCH resource DDR1 according to whether the relative position relationship in the time domain meets the processing criterion are the same as the operations executed by the UE 1 in the first embodiment and can be understood based on the relevant description in the first embodiment, and thus will not be further described herein.

The BS 2 receives the second HARQ-ACK message on the second PUCCH resource UCR2 and the first HARQ-ACK message on the first PUCCH resource UCR1. The BS 2 considers that the first HARQ-ACK message indicates the whole processing result of the first downlink data signal when determining that the UE 1 continues processing the first downlink data signal. The BS 2 considers that the first HARQ-ACK message indicates the current processing result of the first downlink data signal when determining that the UE 1 does not continue processing the first downlink data signal. Besides, if determining that the UE 1 does not continue processing the first downlink data signal, the BS 2 can prepare the subsequent re-transmission of the first downlink data signal in advance.

In other embodiments, the BS 2 may further determine that whether the relative position relationship in the time domain meets the processing criterion according to at least one of the physical resource block (PRB) size, the subcarrier spacing (SCS), the demodulation reference signal (DMRS) position and the transport block (TB) size of the first PDSCH resource DDR1.

In other embodiments, after transmitting the first DCI and before generating the second DCI, the BS 2 further calculates a delay element, additionally incurred by processing the second downlink data signal under the uplink out-of-order configuration at the UE 1, according to the relative position relationship in the time domain. As aforementioned, since the UE 1 must preferentially process the second data downlink signal and the UE 1 may have processed part of the first downlink data signal after the finish of receiving the first downlink data signal and before the finish of receiving the second downlink data signal, the UE 1 needs additional operation time to suspend the first downlink data signal from the current processing and switch to process the second downlink data signal.

The aforesaid additional operation time is the additionally incurred delay element. Therefore, when configuring the second PUCCH resource UCR2, the BS 2 should take the delay element into consideration as well so as to calculate a processing time (i.e., the processing time N2) required by the UE 1 according to the delay element, and check the configuration of the second PUCCH resource UCR2 according to the required processing time to make the time interval T2 absolutely longer than the processing time N2.

In another embodiment, when the first downlink data signal is composed of a plurality of code block groups (CBGs), the BS 2 can only transmit the CBGs which are incorrectly decoded by the UE 1 or are undecoded by UE 1 according to the feedback of the current processing result from the UE 1 after receiving the first HARQ-ACK message from the UE 1.

For simplification of the description, the aforementioned embodiments assume that the first PDSCH resource DDR1 and the first PUCCH resource UCR1 belongs to the eMBB service, and the second PDSCH resource DDR2 and the second PUCCH resource UCR2 belong to the URLLC service. However, it shall be appreciated by those of ordinary skill in the art that in other embodiments, the first PDSCH resource DDR1 and the first PUCCH resource UCR1 may also belong to the URLLC service, but the priority of this URLLC service is lower than the priority of the URLLC service with respect to the second PDSCH resource DDR2 and the second PUCCH resource UCR2. And, those of ordinary skill can easily apply the signal transmission and processing of two URLLC services with high and low priorities into the foregoing implementation scenarios and understand their operations, and thus these operations will not be further described herein. Besides, it shall be noted that in order to make the figures simple and easily read without affecting the description of the present invention, the first DCI, the first PDCCH resource, the first downlink data signal, the second DCI, the second PDCCH resource, and the second downlink data signal are omitted from depiction and not shown in the figures with respect to the foregoing embodiments.

The fifth embodiment of the present invention is as shown in FIGS. 7A-7B and 8A-8B. Similarly, in this embodiment, only the signal transmissions between the single UE 1 and the BS 2 connected thereto are depicted as the examples to describe how the UE 1 decides the uplink signal transmission according to the condition of the resource configuration when the BS 2 configures the uplink resource out of order. The components and the functions of the components relevant to the UE 1 and BS 2 will be further described in the embodiments corresponding to FIG. 9 and FIG. 10. It shall be appreciated by those of ordinary skill in the art that the BS 2 can also perform the signal transmissions with other UEs and executes the similar transmission operations with the other UEs at the same time, and thus it will not be further described herein.

Figure 7A:
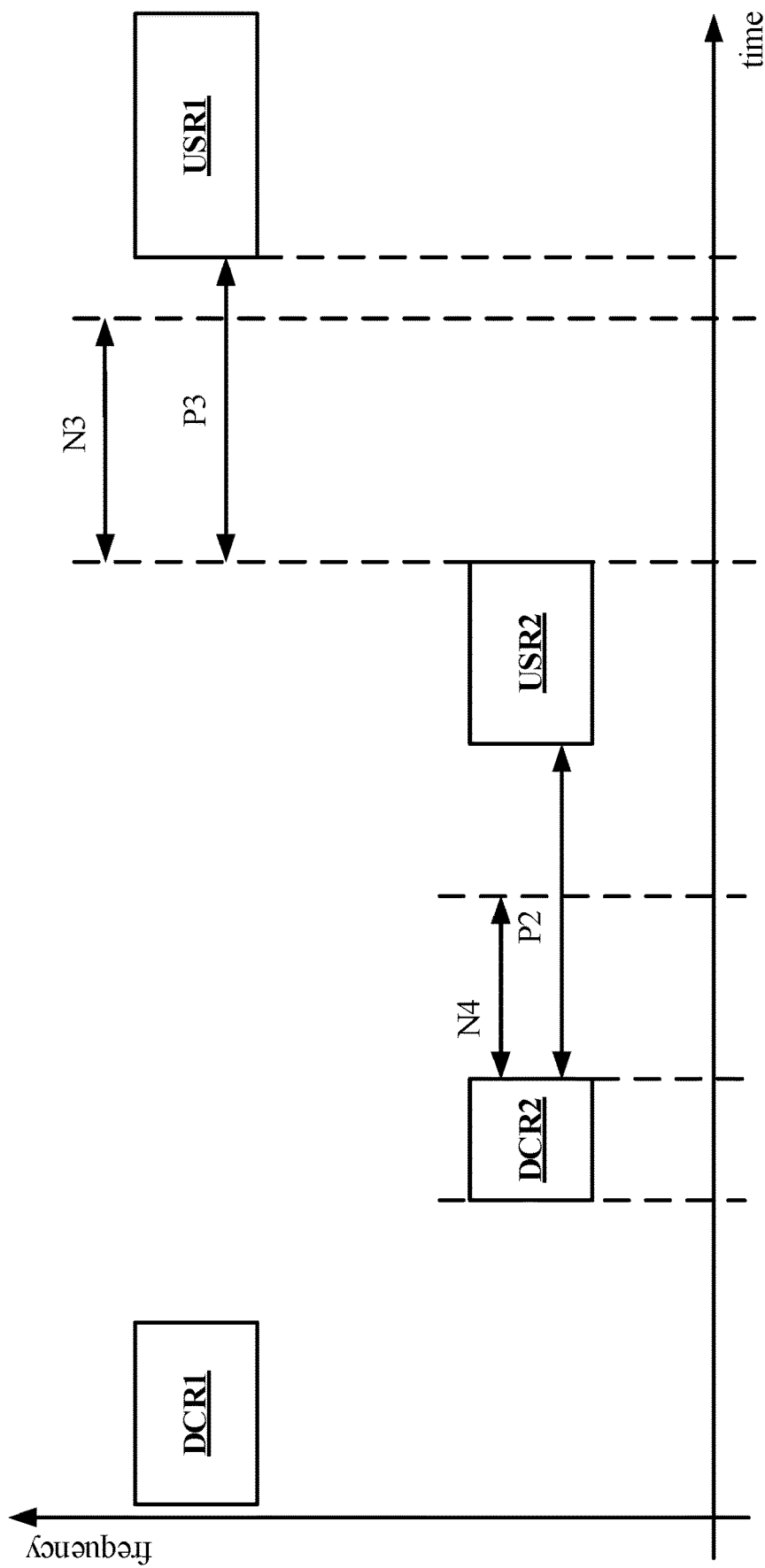

For example, FIGS. 7A-7B depict schematic views of the uplink out-of-order configurations according to the present invention. The UE 1 receives first downlink control information (DCI) (not shown) on a first physical downlink control channel (PDCCH) resource DCR1 from the BS 2. The first DCI indicates a first physical uplink shared channel (PUSCH) resource USR1. After receiving the first DCI, the UE 1 further receives a second DCI (not shown) on a second PDCCH resource DCR2 from the BS 2. The second DCI indicates a second PUSCH resource USR2. The second PUSCH resource USR2 is configured to be advanced to the first PUSCH resource USR1 in the time domain based on the uplink out-of-order configurations.

Here, it also assume that the first PDCCH resource DCR1 and the first PUSCH resource USR1 belongs to the eMBB service, and the second PDCCH resource DCR2 and the second PUSCH resource USR2 belong to the URLLC service. In response to the URLLC service having ultra-reliable and low latency transmission requirement, the BS 2 of the present invention configures the second PUSCH resource USR2 to be advanced to the first PUSCH resource USR1 in the time domain based on the uplink out-of-order configurations to make the UE 1 able to preferentially generate the second uplink data signal and transmit it to the BS 2.

However, since the UE 1 must preferentially generate the second uplink data signal to make sure of transmitting the second uplink data signal on the second PUCCH resource DCR2 as expected, how the UE 1 to deal with such instantaneous transmission for urgency (i.e., how to process the first uplink data signal which is about to be transmitted on the first PUSCH resource USR1) becomes more important. In the present invention, the UE 1 determines whether to continue generating the first downlink data signal being about to be transmitted on the first PUSCH resource USR1 according to whether the relative position relationship among at least two of the first PDCCH resource DCR1, the second PDCCH resource DCR2, the first PUSCH resource USR1 and the second PUSCH resource USR2 in the time domain meets a processing criterion.

Specifically, the UE 1 can determine whether the time to generate the first uplink data signal is enough according to the time interval between the second PUSCH resource USR2 and the first PUSCH resource USR1 or the time interval between the first PDCCH resource DCR1 and the second PDCCH resource DCR2. In the implementation scenarios of FIGS. 7A-7B, the UE 1 uses the time interval P3 between the second PUSCH resource USR2 and the first PUSCH resource USR1 as a basis for determination, and takes that the processing time N3 for generating the first uplink data signal, which is about to be transmitted on the first PUSCH resource USR1, is shorter than the time interval P3 as a processing criterion. It shall be noted that the time interval P3 is calculated from the end of the second PUSCH resource USR2 to the start of the first PUSCH resource USR1.

As shown in FIG. 7A, if the processing time N3 (e.g., the duration of ten OFDM symbols) for generating the first uplink data signal is shorter than the time interval P3 (e.g., the duration of 12 OFDM symbols) between the second PUSCH resource USR2 and the first PUSCH resource USR1, it means that the UE 1 is able to generate the first uplink data signal and transmit the first uplink data signal on the first PUSCH resource USR1 after transmitting the second uplink data signal on the second PUSCH resource USR2 and before the start of the first PUSCH resource USR1.

It shall be understood that the BS 2 would take the processing time N4 (i.e., the duration of three OFDM symbols) of the second uplink data signal and the time interval P2 between the second PDCCH resource DCR2 and the second PUSCH resource USR2 into consideration when configuring the second PDCCH resource DCR2 and the second PUSCH resource USR2 to make the time interval P2 absolutely longer than the processing time N4 (e.g., the time interval P2 must be longer than the duration of three OFDM symbols). It shall be noted that the time interval P2 is calculated from the end of the second PDCCH resource DCR2 to the start of the second PUSCH resource USR2.

As the BS 2 configures the second PUSCH resources USR2 under the uplink out-of-order configuration, the UE 1 has to preferentially generate the second uplink data signal and transmit the second uplink data signal on the second PUSCH resource USR2. As shown in FIG. 7B, if the UE 1 determines the processing time N3 for generating the first uplink data signal is longer than the time interval P3 between the second PUSCH resource USR2 and the first PUSCH resource USR1, the UE 1 will determine that it might not have enough time to generate the first uplink data signal, and thus will stop generating the first uplink data signal and not transmit any data signal on the first PUSCH resource USR1.

Figure 8A:
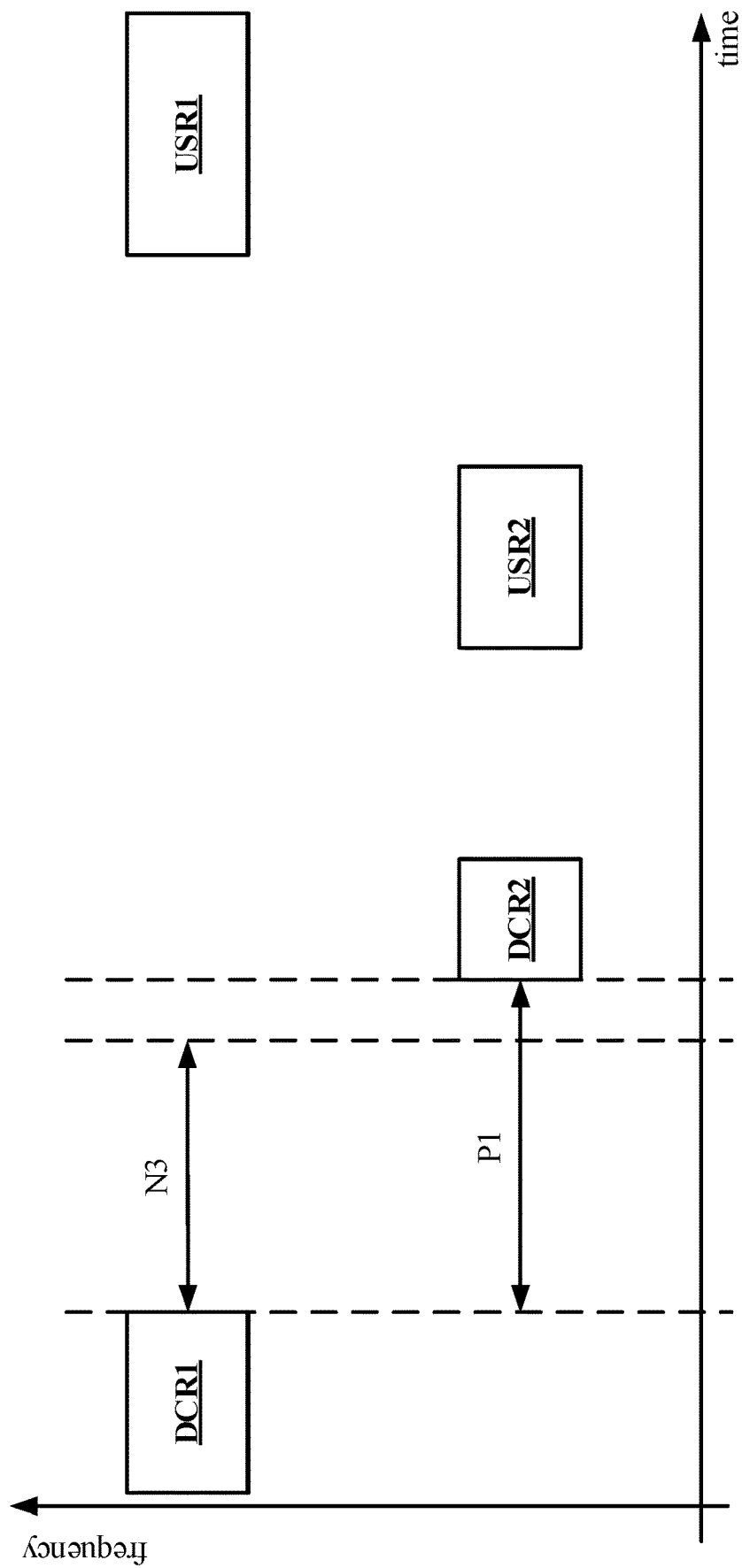
FIGS. 8A-8B depict schematic views of the uplink out-of-order configurations according to the present invention.
Figure 8B:
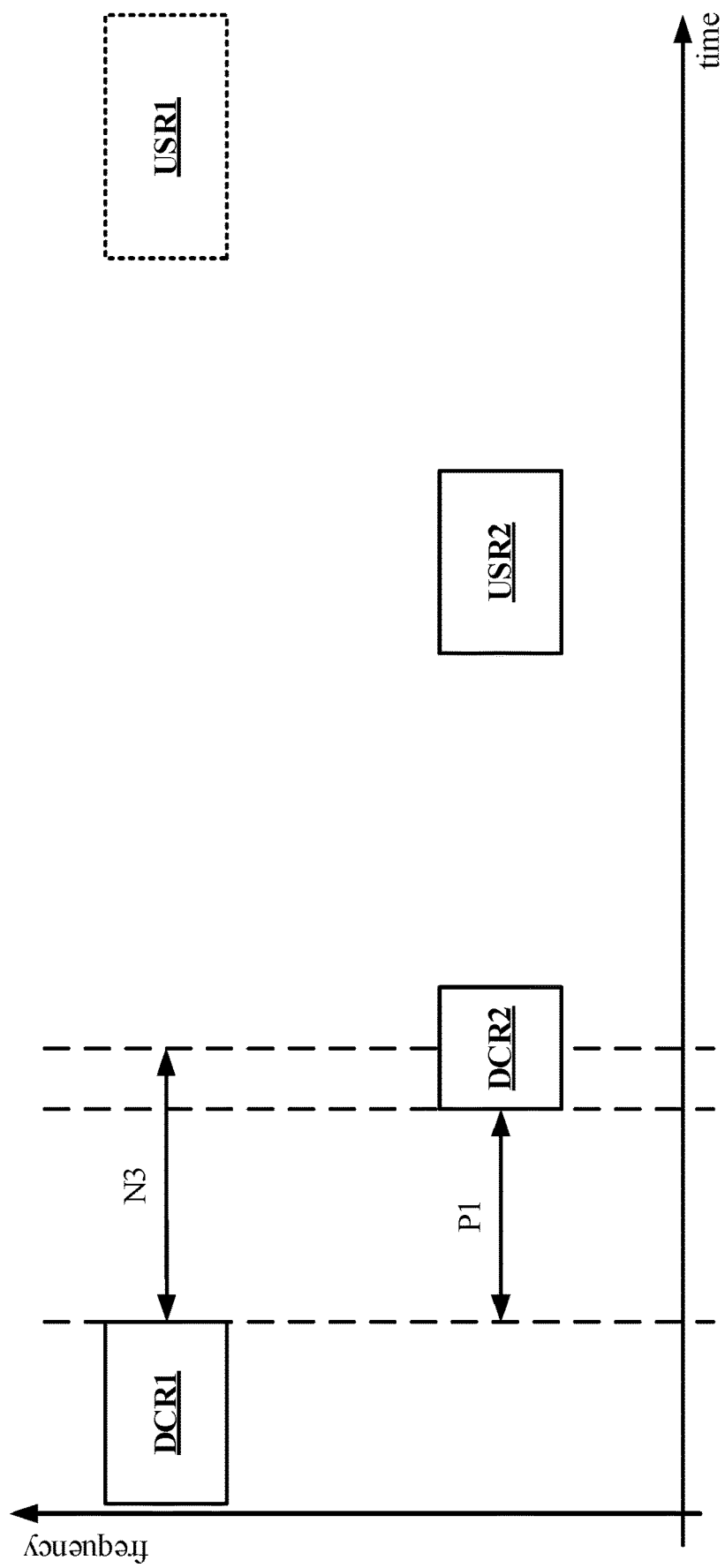

In the implementation scenarios of FIGS. 8A-8B, the UE 1 uses the time interval P1 between the first PDCCH resource DCR1 and the second PDCCH resource DCR2 as a basis for determination, and takes that the processing time N3 for generating the first uplink data signal, which is about to be transmitted on the first PUSCH resource USR1, is shorter than the time interval P1 as a processing criterion. It shall be noted that the time interval P1 is calculated from the end of the first PDCCH resource DCR1 to the start of the second PDCCH resource DCR2.

As shown in FIG. 8A, if the processing time N3 for generating the first uplink data signal is shorter than the time interval P1 between the first PDCCH resource DCR1 and the second PDCCH resource DCR2, it means that the UE 1 is able to generate the first uplink data signal after the finish of receiving the first DCI and before the finish of the receiving the second DCI. However, as shown in FIG. 8B, if the UE 1 determines the processing time N3 for generating the first uplink data signal is longer than the time interval P1 between the first PDCCH resource DCR1 and the second PDCCH resource DCR2, the UE 1 will determine that it might not have enough time to generate the first uplink data signal, and thus will stop generating the first uplink data signal and not transmit any data signal on the first PUSCH resource USR1.

In another embodiment, the UE 1 further receives a radio resource control (RRC) message carrying an uplink out-of-order transmission activation indicator from the BS 2. In this way, the UE 1 can learn that the BS 2 may configure uplink resource under the uplink out-of-order configuration according to the uplink out-of-order transmission activation indicator so as to decide the uplink signal transmission according to the condition of the resource configuration as illustrated in the foregoing implementation scenarios, The sixth embodiment is an extension of the fifth embodiment. In this embodiment, the UE 1 further calculates a delay element, additionally incurred by processing the first uplink data signal under the uplink out-of-order configuration, according to the relative position relationship. In detail, since the UE 1 must preferentially generate the second uplink data signal and the UE 1 may have started generating the first uplink data signal after the finish of receiving the first DCI and before the finish of receiving the second DCI, the UE 1 needs additional operation time to suspend the first uplink data signal from the current generating, switch to generate the second uplink data signal, and resume generating the first uplink data signal after the finish of generating the second uplink data signal.

The aforesaid additional operation time is the additionally incurred delay element. Therefore, the UE 1 should take the delay element into consideration as well so as to calculate a required processing time (i.e., the processing time N3) according to the delay element, and determines whether the relative position relationship meets the processing criterion according to the required processing time. In other words, in the present invention, the processing time N3 of the first uplink data signal needs to further consider the influence caused by the uplink out-of-order configuration.

Likewise, since the UE 1 may have started generating the first uplink data signal before the finish of receiving the second DCI, the UE 1 needs additional operation time to suspend the first uplink data signal from the current generating and switch to generating the second uplink data signal. Such additional operation time is the additionally incurred delay element which the BS 2 should take into consideration. Therefore, when configuring the second PUSCH resource USR2, the BS 2 should take the delay element into consideration as well so as to calculate a processing time (i.e., the processing time N4) according to the delay element, and configure the second PUSCH resource USR2 according to the required processing time to make the time interval P2 absolutely longer than the processing time N4.

The seventh embodiment is an extension of the fifth embodiment. The UE 1 further generates the UE capability report message indicating its UE capability to report its UE capability report message to the BS 2. The UE capability includes a parallel processing capability and a PUSCH processing capability on each of a plurality of component carriers (CC). The parallel processing capability may include a multiple carriers operating capability. When the BS 2 receives the UE capability report message indicating the UE capability, the BS 2 can determine whether the UE 1 is able to continue generating the first uplink data signal according to the UE capability.

If the BS 2 determines that the UE 1 does not have the parallel processing capability, the BS 2 will also determine whether the UE 1 continues generating the first uplink data signal according to whether the relative position relationship among at least two of the first PDCCH resource DCR1, the second PDCCH resource DCR2, the first PUSCH resource USR1 and the second PUSCH resource USR2 in the time domain meets the processing criterion. The description about the relative position relationship in the time domain please refer to the relevant description in the fifth embodiment and FIGS. 7A-7B and 8A-8B, and thus will not be further described herein. If the BS 2 determines that the UE 1 is unable to continue generating the first uplink data signal, the BS 2 can re-configure another first PUSCH resource for the UE 1 to re-transmit the first uplink data signal.

In another embodiment, the UE 1 takes that the first PUSCH resource USR1 is not at least partially overlapped with the second PUSCH resource USR2 as a processing criterion. If the UE 1 determines that the first PUSCH resource USR1 is at least partially overlapped with the second PUSCH resource USR2 according to the relative position relationship in the time domain, the UE 1 will determine that the relative position relationship in the time domain does not meet the processing criterion and decide not to continue generating the first uplink data signal. Similarly, if the BS 2 configures the second PUSCH resource USR2, which is later configured, to be partially overlapped with the first PUSCH resource USR1 in the time domain or in both the time and frequency domains, it means that the BS 2 considers the second uplink data signal is very important so that the UE 1 can stop generating the first uplink data signal directly.

In another embodiment, the UE 1 may further determine whether the relative position relationship meets the processing criterion according to at least one of a physical resource block (PRB) size, a subcarrier spacing (SCS) and a transport block (TB) size of the first PUSCH resource USR1. Similarly, those of ordinary skill in the art could understand that the PRB size and TB size will determine the data amount of the downlink signal, and the SCS will determine a period of one OFDM symbol. Thus, these factors may be taken into consideration when calculating and estimating the processing time N3 of the first uplink data signal, and may be used for determining whether to continue generating the first uplink data signal accordingly.

The eighth embodiment is an extension of the fifth embodiment. In this embodiment, the first uplink data signal is composed of a plurality of code block groups (CBGs). As aforementioned, the UE 1 may have started generating the first uplink data signal after the finish of receiving the first DCI and before the finish of receiving the second DCI. Thus, when deciding not to continue generating the first uplink data signal, the UE 1 may still transmit the generated CBGs of the first uplink data signal on the first PUSCH resource USR1. By this way, the BS 2 can allocate a PUSCH resource with a suitable size subsequently for the UE 1 to transmit the CBGs which are not transmitted yet.

Besides, when deciding to continue generating the first uplink data signal, if the UE 1 determines that an overlapped resource exists between the first PUSCH resource USR1 and the second PUSCH resource USR2 according to the relative position relationship between the first PUSCH resource USR1 and the second PUSCH resource USR2 in the time domain, the UE 1 may still transmits the CBGs of the first uplink data signal, which do not correspond to the overlapped resource, on the first PUSCH resource USR1. In other words, in the case that the overlapped resource exists between the first PUSCH resource USR1 and the second PUSCH resource USR2 and the first uplink data signal is composed of the multiple CBGs, the UE 1 may still transmits the CBGs of the first uplink data signal which do not correspond to the overlapped resource.

It shall be noted that in order to make the figures simple and easily read without affecting the description of the present invention, the first DCI, the first uplink data signal, the second DCI, and the second uplink data signal are omitted from depiction and not shown in the figures with respect to the foregoing embodiments. In addition, the configurations of the uplink and downlink resources in the above FIGS. 1A-1B, 2A-2B, 3A-3B, 4A-4B, 5A-5B, 6A-6B, 7A-7B and 8A-8B are illustrated based on the Time Division Duplex (TDD) structure. However, those of ordinary skill in the art could understand that the foregoing technical contents can also be applied to the Frequency Division Duplexing (FDD) structure directly, and thus it will not be further described herein.

Figure 9:
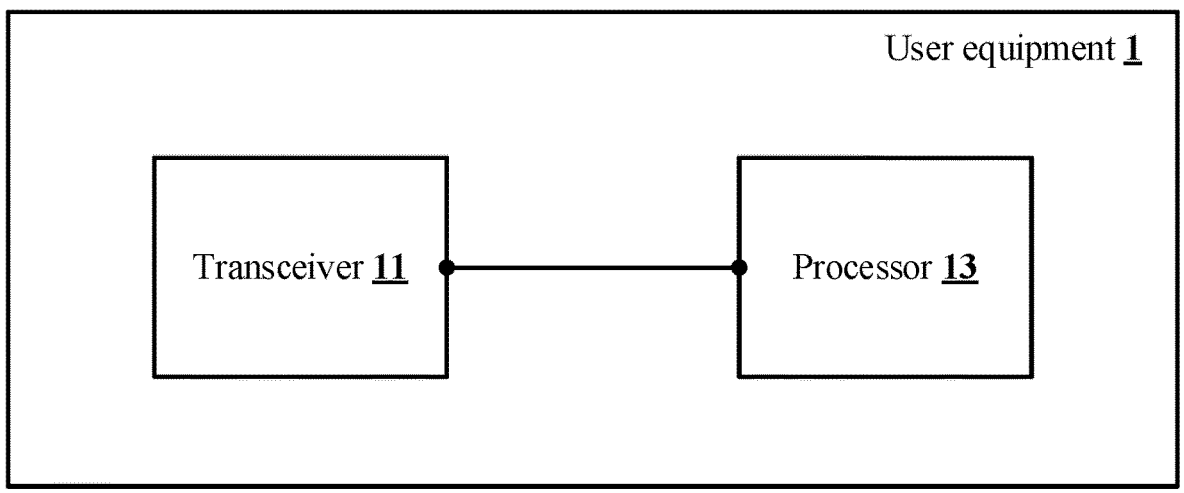
FIG. 9 is a schematic view of the UE 1 according to the present invention.

A ninth embodiment of the present invention is as shown in FIG. 9, which is a schematic view of the UE 1 according to the present invention. The UE 1 comprises a transceiver 11 and a processor 13. The processor 13 is electrically connected to the transceiver 11. For simplifying the description, other components of the UE 1 such as the storage, the housing, the power supply module and other components irrelevant to the present invention are omitted from depiction in the drawings. The processor 13 may be any of various processors, Central Processing Units (CPUs), microprocessors, digital signal processors, or other computing devices known to those of ordinary skill in the art.

With respect to the first embodiment, the processor 13 receives the first DCI on the first PDCCH resource from the BS 2 via the transceiver 11. The first DCI indicates the first PDSCH resource and the first PUCCH resource. After receiving the first DCI, the processor 13 receives the second DCI on the second PDCCH resource from the BS 2 via the transceiver 11. The second DCI indicates the second PDSCH resource and the second PUCCH resource. The second PUCCH resource is configured to be advanced to the first PUCCH resource in the time domain based on an uplink out-of-order configuration.

The processor 13 determine whether to continue processing the first downlink data signal on the first PDSCH resource according to whether a relative position relationship among at least two of the first PDSCH resource, the second PDSCH resource, the first PUCCH resource and the second PUCCH resource in the time domain meets a processing criterion. As described in the first embodiment, the UE 1 can use the time interval between any two resources as a basis for determining if having enough time to processing the first downlink data signal.

When determining to continue processing the first downlink data signal, the processor 13 generates the first HARQ-ACK message according to the whole processing result of the first downlink data signal. When determining not to continue processing the first downlink data signal, the processor 13 generates the first HARQ-ACK message according to the current processing result of the first downlink data signal. The processor 13 processes the second downlink data signal on the second PDSCH resource, and generates a second HARQ-ACK message according to the processing result of the second downlink data signal. The processor 13 transmits the second HARQ-ACK message on the second PUCCH resource to the BS 2 via the transceiver 11. Afterwards, the processor 13 transmits the first HARQ-ACK message on the first PUCCH resource to the BS 2 via the transceiver 11.

In other embodiment, the processor 13 further calculates the delay element, additionally incurred by processing the first downlink data signal under the uplink out-of-order configuration, according to the relative position relationship in the time domain, as described in the second embodiment. Thus, the processor 13 calculates the required processing time according to the delay element, and determines whether the relative position relationship in the time domain meets the processing criterion according to the required processing time.

In other embodiments, the processor 13 further determines whether the relative position relationship in the time domain meets the processing criterion according to at least one of the physical resource block size (PRB), the subcarrier spacing (SCS), the demodulation reference signal (DMRS) position and the transport block (TB) size of the first PDSCH resource.

In another embodiment, when the processor 13 determines not to continue processing the first downlink data signal, the first HARQ-ACK message indicates that the first downlink data signal is incorrectly decoded. In another embodiment, the processor 13 further receives the RRC message carrying the uplink out-of-order transmission activation indicator from the BS 2 via the transceiver 11.

In other embodiments, the processor 13 further generates the UE capability report message and transmits the UE capability report message to the BS 2 via the transceiver 11. The UE capability report message indicates a UE capability including a parallel processing capability and the PDSCH processing capability on each of component carriers. As described in the fourth embodiment, the parallel processing capability includes a multiple carriers operating capability.

In other embodiment, the first downlink data signal is composed of the CBGs, and the processor 13 further determines whether the CBGs include the decoded part and the undecoded part to generate the current processing result when determining not to continue processing the first downlink data signal. The first HARQ-ACK message indicates the decoding result of the decoded part and indicates that the undecoded part is incorrectly decoded.

A tenth embodiment of the present invention please also refer to FIG. 9, which corresponding to the fifth embodiment. The processor 13 receives the first DCI on the first PDCCH resource from the BS 2 via the transceiver 11. The first DCI indicates the first PUSCH resource. After receiving the first DCI, the processor 13 receives the second DCI on the second PDCCH resource from the BS 2 via the transceiver 11. The second DCI indicates the second PUSCH resource. The second PUSCH resource is configured to be advanced to the first PUSCH resource in the time domain based on the uplink out-of-order configuration.

The processor 13 determines whether to continue generating the first uplink data signal, which is about to be transmitted on the first PUSCH resource, according to whether the relative position relationship among at least two of the first PDCCH resource, the second PDCCH resource, the first PUSCH resource and the second PUSCH resource in the time domain meets a processing criterion. As described in the fifth embodiment, the UE 1 can use the time interval between any two resources as a basis for determining if having enough time to generating the first uplink data signal.

The processor 13 generates the second uplink data signal which is about to be transmitted on the second PUSCH resource, and transmits the second uplink data signal on the second PUSCH resource via the transceiver 11. Afterwards, when determining to continue generating the first uplink data signal, the processor 13 transmits at least part of the first uplink data signal on the first PUSCH resource via the transceiver 11.

In other embodiments, the processor 13 further calculates the delay element, additionally incurred by processing the first uplink data signal under the uplink out-of-order configuration, according to the relative position relationship in the time domain, as described in the sixth embodiment. Thus, the processor 13 further calculates the required processing time according to the delay element, and determines whether the relative position relationship in the time domain meets the processing criterion according to the required processing time.

In other embodiments, the processor 13 further determines whether the relative position relationship in the time domain meets the processing criterion according to at least one of the physical resource block (PRB) size, the subcarrier spacing (SCS) and the transport block (TB) size of the first PUSCH resource. In another embodiment, the processor 13 further receives the RRC message carrying the uplink out-of-order transmission activation indicator from the BS 2 via the transceiver 11.

In other embodiments, the processor 13 further generates the UE capability report message and transmits the UE capability report message to the BS 2 via the transceiver 11. The UE capability report message indicates the UE capability, and the UE capability includes the parallel processing capability and the PUSCH processing capability on each of the component carriers. The parallel processing capability may include the multiple carriers operating capability, as described in the seventh embodiment.

In other embodiments, the processor 13 further determines that relative position relationship in the time domain does not meet the processing criterion when the first PUSCH resource is at least partially overlapped with the second PUSCH resource according to the relative position relationship between the first PUSCH resource and the second PUSCH resource in the time domain, and decides not to continue generating the first uplink data signal.

In other embodiments, the first uplink data signal is composed of the CBGs. When determining to continue generating the first uplink data signal, the processor 13 further determines whether the overlapped resource exists between the first PUSCH resource and the second PUSCH resource according to the relative position relationship between the first PUSCH resource and the second PUSCH resource in the time domain. When the overlapped resource exists, the processor 13 transmits the CBGs of the first uplink data signal, which do not correspond to the overlapped resource, on the first PUSCH resource via the transceiver 11, as described in the eighth embodiment.

Figure 10:
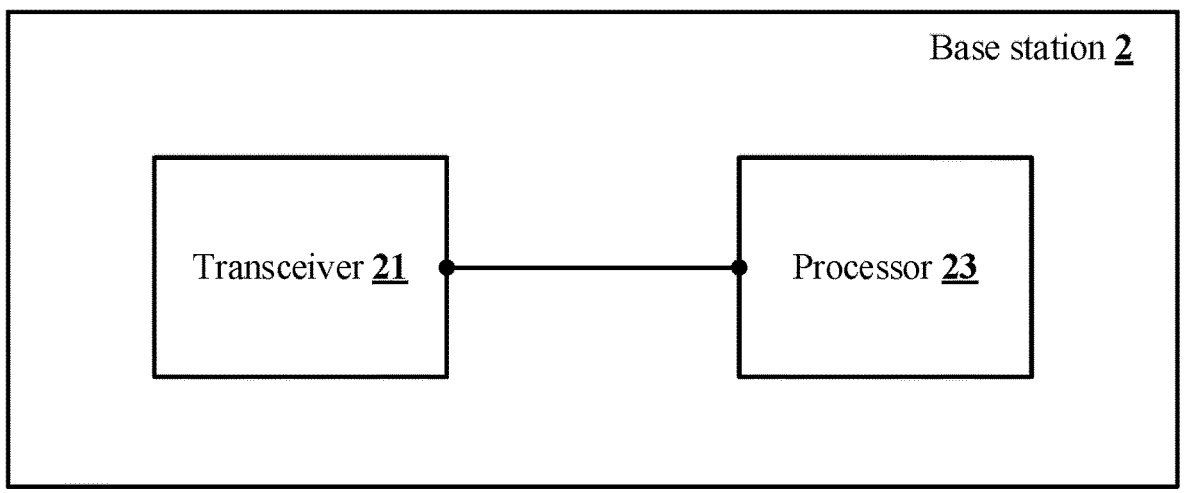
FIG. 10 is a schematic view of the BS 2 according to the present invention.

An eleventh embodiment of the present invention is as shown in FIG. 10, which is a schematic view of the BS 2 according to the present invention. The BS 2 in the 5G mobile communication system is usually called a "gNB." The BS 2 comprises a transceiver 21 and a processor 23. The processor 23 is electrically connected to the transceiver 21. It shall be appreciated that, for simplifying the description, other components of the BS 2 such as the storage, the housing, the power supply module and other components irrelevant to the present invention are omitted from depiction in the drawings. The processor 23 may be any of various processors, Central Processing Units (CPUs), microprocessors, digital signal processors, or other computing devices known to those of ordinary skill in the art.

With respect to the fourth embodiment, the processor 23 transmits the first DCI on the first PDCCH resource to the UE 1 via the transceiver 21. The first DCI indicates the first PDSCH resource and the first PUCCH resource. After transmitting the first DCI, the processor 23 transmits the second DCI on the second PDCCH resource to the UE 1 via the transceiver 21. The second DCI indicates the second PDSCH resource and the second PUCCH resource. The second PUCCH resource is configured to be advanced to the first PUCCH resource in the time domain based on the uplink out-of-order configuration.

The processor 23 determines whether the UE 1 continues processing the first downlink data signal on the first PDSCH resource according to whether the relative position relationship among at least two of the first PDSCH resource, the second PDSCH resource, the first PUCCH resource and the second PUCCH resource in the time domain meets a processing criterion. The processor 23 receives the second HARQ-ACK message on the second PUCCH resource via the transceiver 21, and receives the first HARQ-ACK message on the first PUCCH resource via the transceiver 21. When the BS 2 determines that the UE 1 continues processing the first downlink data signal, the first HARQ-ACK message indicates the whole processing result of the first downlink data signal. When the BS 2 that determines the UE 1 does not continue processing the first downlink data signal, the first HARQ-ACK message indicates the current processing result of the first downlink data signal.

In other embodiments, after transmitting the first DCI and before generating the second DCI, the processor further calculates the delay element, additionally incurred by processing the second downlink data signal under the uplink out-of-order configuration at the UE 1, according to the relative position relationship in the time domain. The processor 23 calculates the required processing time according to the delay element, and checks the configuration of the second PUCCH resource according to the required processing time.

In other embodiments, the processor 23 further determines whether the relative position relationship in the time domain meets the processing criterion according to at least one of the physical resource block (PRB) size, the subcarrier spacing (SCS), the demodulation reference signal (DMRS) position and the transport block (TB) size of the first PDSCH resource.

In other embodiments, the processor 23 further receives the UE capability report message indicating the UE capability from the UE 1 via the transceiver 21. The processor 23 determines whether the UE 1 continues processing the first downlink data signal according to the UE capability. The UE capability may include the parallel processing capability and the PDSCH processing capability on each of the component carriers. The parallel processing capability may include the multiple carriers operating capability.

According to the above descriptions, the UE of the present invention is able to preferentially process or generate the data signal with the low latency transmission requirement under the uplink out-of-order configuration and determine whether to continue processing or generating the data signal with higher tolerance to latency according to the relative position relationship among at least two resources in the time domain so as to decide the signal transmission on the corresponding uplink resource. Accordingly, the present invention can meet the requirement of the URLLC service under the uplink out-of-order configurations of the uplink resources, and make the BS and the UE able to take an appropriate course of action in response to the uplink out-of-order configurations.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a mobile communication system, comprising:
   a transceiver; and
   a processor electrically connected to the transceiver, being configured to execute the following operations:
   receiving first downlink control information (DCI) on a first physical downlink control channel (PDCCH) resource from a base station (BS) via the transceiver, the first DCI indicating a first physical downlink shared channel (PDSCH) resource and a first physical uplink control channel (PUCCH) resource;
   receiving second DCI on a second PDCCH resource from the BS via the transceiver after receiving the first DCI, the second DCI indicating a second PDSCH resource and a second PUCCH resource, the second PUCCH resource being configured to be advanced to the first PUCCH resource in a time domain based on an uplink out-of-order configuration;
   determining whether to continue processing a first downlink data signal on the first PDSCH resource according to whether a relative position relationship among at least two of the first PDSCH resource, the second PDSCH resource, the first PUCCH resource and the second PUCCH resource in the time domain meets a processing criterion;

generating a first hybrid automatic repeat request acknowledgement (HARQ-ACK) message according to a whole processing result of the first downlink data signal when determining to continue processing the first downlink data signal;

generating the first HARQ-ACK message according to a current processing result of the first downlink data signal when determining not to continue processing the first downlink data signal;

processing a second downlink data signal on the second PDSCH resource;

generating a second HARQ-ACK message according to a processing result of the second downlink data signal;

transmitting the second HARQ-ACK message on the second PUCCH resource to the BS via the transceiver; and transmitting the first HARQ-ACK message on the first PUCCH resource to the BS via the transceiver.

2. The user equipment of claim 1, wherein the processor further calculates a delay element, additionally incurred by processing the first downlink data signal under the uplink out-of-order configuration, according to the relative position relationship in the time domain, calculates a required processing time according to the delay element, and determines whether the relative position relationship in the time domain meets the processing criterion according to the required processing time.

3. The user equipment of claim 1, wherein the processor further determines whether the relative position relationship in the time domain meets the processing criterion according to at least one of a physical resource block size (PRB), a subcarrier spacing (SCS), a demodulation reference signal (DMRS) position and a transport block (TB) size of the first PDSCH resource.

4. The user equipment of claim 1, wherein the processor further generates a UE capability report message and transmits the UE capability report message to the BS via the transceiver, the UE capability report message indicates a UE capability, and the UE capability comprises a parallel processing capability and a PDSCH processing capability on each of a plurality of component carriers.

5. The user equipment of claim 4, wherein the parallel processing capability comprises a multiple carriers operating capability.

6. The user equipment of claim 1, wherein when the processor determines not to continue processing the first downlink data signal, the first HARQ-ACK message indicates that the first downlink data signal is incorrectly decoded.

7. The user equipment of claim 1, wherein the first downlink data signal is composed of a plurality of code block groups (CBGs), the processor further determines whether the CBGs include a decoded part and an undecoded part to generate the current processing result when determining not to continue processing the first downlink data signal, and the first HARQ-ACK message indicates a decoding result of the decoded part and indicates that the undecoded part is incorrectly decoded.

8. The user equipment of claim 1, wherein the processor further receives a radio resource control (RRC) message carrying an uplink out-of-order transmission activation indicator from the BS via the transceiver.

9. A base station (BS) for a mobile communication system, comprising:

a transceiver; and a processor electrically connected to the transceiver, being configured to execute the following operations:

transmitting first downlink control information (DCI) on a first physical downlink control channel (PDCCH) resource to a user equipment (UE) via the transceiver, the first DCI indicating a first physical downlink shared channel (PDSCH) resource and a first physical uplink control channel (PUCCH) resource;

transmitting second DCI on a second PDCCH resource to the UE via the transceiver after transmitting the first DCI, the second DCI indicating a second PDSCH resource and a second PUCCH resource, the second PUCCH resource being configured to be advanced to the first PUCCH resource in a time domain based on an uplink out-of-order configuration;

determining whether the UE continues processing a first downlink data signal on the first PDSCH resource according to whether a relative position relationship among at least two of the first PDSCH resource, the second PDSCH resource, the first PUCCH resource and the second PUCCH resource in the time domain meets a processing criterion;

receiving a second HARQ-ACK message on the second PUCCH resource; and receiving a first HARQ-ACK message on the first PUCCH resource;

wherein the first HARQ-ACK message indicates a whole processing result of the first downlink data signal when the BS determines that the UE continues processing the first downlink data signal, and the first HARQ-ACK message indicates a current processing result of the first downlink data signal when the BS determines that the UE does not continue processing the first downlink data signal.

10. The base station of claim 9, wherein after transmitting the first DCI and before generating the second DCI, the processor further calculates a delay element, additionally incurred by processing the second downlink data signal under the uplink out-of-order configuration at the UE, according to the relative position relationship in the time domain, and the processor calculates a required processing time according to the delay element and checks a configuration of the second PUCCH resource according to the required processing time.

11. The base station of claim 9, wherein the processor further determines whether the relative position relationship in the time domain meets the processing criterion according to at least one of a physical resource block (PRB) size, a subcarrier spacing (SCS), a demodulation reference signal (DMRS) position and a transport block (TB) size of the first PDSCH resource.

12. The base station of claim 9, wherein the processor further receives a UE capability report message indicating a UE capability from the UE via the transceiver, and the processor determines whether the UE continues processing the first downlink data signal according to the UE capability.

13. The base station of claim 12, wherein the UE capability comprises a parallel processing capability and a PDSCH processing capability on each of a plurality of component carriers, and the parallel processing capability comprises a multiple carriers operating capability.

* * * * *